United States Patent
Ochoa et al.

(10) Patent No.: US 10,244,888 B2
(45) Date of Patent: Apr. 2, 2019

(54) SYSTEM FOR MIXING BEVERAGES AND METHOD OF DOING THE SAME

(71) Applicant: Gudpod Corp., Carefree, AZ (US)

(72) Inventors: Gian-Carlo Ochoa, Bronxville, NY (US); Brendan Duffy, Sandy Hook, CT (US); Jon B. Taylor, Groton, MA (US); Gary Van Deursen, Essex, CT (US)

(73) Assignee: Gudpod Corp., Newburgh, NY (US)

( * ) Notice: Subject to any disclaimer, the term of this patent is extended or adjusted under 35 U.S.C. 154(b) by 68 days.

(21) Appl. No.: 15/299,249

(22) Filed: Oct. 20, 2016

(65) Prior Publication Data
US 2017/0049261 A1 Feb. 23, 2017

Related U.S. Application Data

(63) Continuation of application No. 14/381,521, filed as application No. PCT/US2013/027982 on Feb. 27, 2013, now Pat. No. 9,504,974.
(Continued)

(51) Int. Cl.
*A47J 31/40* (2006.01)
*A47J 31/44* (2006.01)
(Continued)

(52) U.S. Cl.
CPC ............ *A47J 31/407* (2013.01); *A23L 2/52* (2013.01); *A23L 29/00* (2016.08); *A23L 33/10* (2016.08);
(Continued)

(58) Field of Classification Search
CPC .......... B01F 15/00123; B01F 15/00305; B01F 15/00311; B01F 15/0206;
(Continued)

(56) References Cited

U.S. PATENT DOCUMENTS 1,233,823 A 7/1917 Tiger
1,412,401 A 4/1922 Gotfredsen
(Continued)

FOREIGN PATENT DOCUMENTS

CN 101181134 A 5/2008
CN 101784217 A 7/2010
(Continued)

OTHER PUBLICATIONS

International Search Report, PCT/US2015/017142, dated Jul. 14, 2015 (6 pages).
(Continued)

*Primary Examiner* — Tony G Soohoo
(74) *Attorney, Agent, or Firm* — Nixon Peabody LLP

(57) ABSTRACT

The present invention relates to a system and process for a nutraceutical beverage compounding system and methods for the same. Provided is a customizable supplement beverage system and method for personalizing and operating the same to a particular user and optionally for operative tracking. Proposed additionally is an operative system for receiving and individually identifying a concentrate or supplement combinations, for mixing the same prior to a use, and for dispensing the same for use, and for tracking control factors relating to the same.

27 Claims, 26 Drawing Sheets

Related U.S. Application Data

(60) Provisional application No. 61/666,835, filed on Jun. 30, 2012, provisional application No. 61/604,410, filed on Feb. 28, 2012.

(51) Int. Cl.

| | | |
|---|---|---|
| *B01F 3/12* | (2006.01) | |
| *B01F 7/00* | (2006.01) | |
| *B01F 15/00* | (2006.01) | |
| *B01F 15/02* | (2006.01) | |
| *A23L 2/52* | (2006.01) | |
| *A23L 29/00* | (2016.01) | |
| *A23L 33/10* | (2016.01) | |
| *G07F 13/06* | (2006.01) | |

(52) U.S. Cl.
CPC ......... *A47J 31/401* (2013.01); *A47J 31/4492* (2013.01); *B01F 3/12* (2013.01); *B01F 3/1271* (2013.01); *B01F 7/00008* (2013.01); *B01F 15/00123* (2013.01); *B01F 15/00305* (2013.01); *B01F 15/00311* (2013.01); *B01F 15/0206* (2013.01); *G07F 13/065* (2013.01); *A23V 2002/00* (2013.01); *B01F 2215/0032* (2013.01)

(58) Field of Classification Search
CPC .. B01F 2215/0032; B01F 3/12; B01F 3/1271; B01F 7/00008; A47J 31/401; A47J 31/407; A47J 31/4492; A23L 29/00; A23L 2/52; A23L 33/10; A23V 2002/00; G07F 13/065

See application file for complete search history.

(56) References Cited

U.S. PATENT DOCUMENTS

| | | | |
|---|---|---|---|
| 1,496,611 | A | 6/1924 | Siegel |
| 2,021,626 | A | 11/1935 | Flegel |
| 3,061,279 | A | 10/1962 | Reed |
| 3,134,577 | A | 5/1964 | Bollmeier |
| 3,240,391 | A | 3/1966 | Garton |
| 3,738,619 | A | 6/1973 | Shirae |
| 4,160,602 | A | 7/1979 | Benz |
| 4,193,698 | A | 3/1980 | Gartner |
| 4,195,730 | A | 4/1980 | Hunt |
| 4,408,690 | A | 10/1983 | Ferrero |
| 4,547,076 | A | 10/1985 | Maurer |
| 4,703,770 | A | 11/1987 | Arzberger |
| 5,328,263 | A | 7/1994 | Neilson |
| 5,439,289 | A | 8/1995 | Neilson |
| 5,634,714 | A | 6/1997 | Guild |
| 5,766,665 | A | 6/1998 | Miller |
| 5,863,118 | A | 1/1999 | Ackels |
| 5,865,538 | A | 2/1999 | Walker |
| 6,071,006 | A | 6/2000 | Hochstein |
| 6,616,323 | B2 | 9/2003 | McGill |
| 6,647,863 | B2 | 11/2003 | Lang |
| 6,706,300 | B1 | 3/2004 | Lassota |
| 6,708,735 | B1 | 3/2004 | Kenihan |
| 7,144,150 | B2 | 12/2006 | Farrell |
| 7,648,049 | B1 | 1/2010 | Lassota |
| 7,762,181 | B2 | 7/2010 | Boland |
| 7,854,104 | B2 | 12/2010 | Cronin |
| 7,856,920 | B2 | 12/2010 | Schmed |
| 8,337,074 | B2 | 12/2012 | Wild |
| 8,807,823 | B2 | 8/2014 | Williams |
| 8,844,426 | B2 | 9/2014 | Ochoa |
| 2002/0009017 | A1 | 1/2002 | Kolar |
| 2004/0112222 | A1* | 6/2004 | Fischer ............... A47J 31/3628 99/279 |
| 2004/0155061 | A1 | 8/2004 | Roth |
| 2004/0188459 | A1* | 9/2004 | Halliday ............. A47J 31/0673 222/83 |
| 2005/0193896 | A1 | 9/2005 | McGill |
| 2006/0081653 | A1 | 4/2006 | Boland |
| 2007/0017376 | A1* | 1/2007 | Oehninger .......... A47J 31/4482 99/279 |
| 2007/0068393 | A1* | 3/2007 | Nosler ................. A47J 31/007 99/279 |
| 2007/0109913 | A1* | 5/2007 | McGill ................ A47J 43/046 366/205 |
| 2007/0157821 | A1* | 7/2007 | Panesar .............. A47J 31/0673 99/279 |
| 2008/0067172 | A1 | 3/2008 | Wilhelm |
| 2008/0148948 | A1* | 6/2008 | Evers ................... A47J 31/407 99/275 |
| 2008/0160153 | A1* | 7/2008 | Hestekin .................. A23L 2/00 426/590 |
| 2008/0187638 | A1* | 8/2008 | Hansen .............. A47J 31/0673 426/433 |
| 2008/0223741 | A1 | 9/2008 | Nyambi |
| 2008/0279040 | A1* | 11/2008 | Neilson ................ B01F 7/1605 366/176.1 |
| 2009/0065570 | A1 | 3/2009 | Peters |
| 2009/0179042 | A1 | 7/2009 | Milan |
| 2009/0293735 | A1 | 12/2009 | Van Dillen |
| 2010/0136064 | A1 | 6/2010 | Shatkina |
| 2010/0154645 | A1 | 6/2010 | Nosler |
| 2010/0163509 | A1 | 7/2010 | Hoffa |
| 2010/0173856 | A1 | 7/2010 | Denk |
| 2010/0214867 | A1* | 8/2010 | Karkos, Jr. ........... A47J 43/085 366/272 |
| 2011/0030564 | A1* | 2/2011 | Cocco ................. A47J 31/3671 99/323.3 |
| 2011/0110180 | A1* | 5/2011 | Snider .................. A47J 31/407 366/142 |
| 2011/0120316 | A1 | 5/2011 | Castellani |
| 2011/0200726 | A1* | 8/2011 | Tinkler ................... A47J 31/32 426/431 |
| 2012/0121768 | A1 | 5/2012 | Lai |
| 2012/0171186 | A1 | 7/2012 | Liang |
| 2012/0295234 | A1* | 11/2012 | Rognon .............. A47J 31/3623 434/127 |
| 2013/0171320 | A1* | 7/2013 | Scholvinck .......... A47J 31/402 426/590 |
| 2013/0312619 | A1* | 11/2013 | Spiegel .............. A47J 31/3623 99/295 |
| 2014/0335482 | A1 | 11/2014 | Aronis |
| 2014/0336817 | A1 | 11/2014 | Ochoa |
| 2015/0065587 | A1 | 3/2015 | Ochoa |
| 2015/0135965 | A1 | 5/2015 | Lo Foro |

FOREIGN PATENT DOCUMENTS

| | | |
|---|---|---|
| FR | 2507573 | 12/1982 |
| WO | WO 2011/124990 | 10/2011 |
| WO | WO 2013/033786 | 3/2013 |
| WO | WO 2013/130576 | 9/2013 |
| WO | WO 2015/148027 | 10/2015 |

OTHER PUBLICATIONS

Written Opinion of the International Searching Authority, PCT/US2015/017142, dated Jul. 14, 2015 (14 pages).

International Search Report in PCT/AU2012/001072, dated Nov. 20, 2012 (5 pages).

International Preliminary Report on Patentability and Written Opinion in PCT/AU2012/001072, dated Mar. 12, 2014 (7 pages).

International Search Report in PCT/US2013/027982, Russian Patent Office, dated Jul. 11, 2013 (2 pages).

Written Opinion of the International Searching Authority in PCT/US2013/027982, Russian Patent Office, dated Jun. 3, 2013 (4 pages).

Extended European Search Report for Application No. EP 13755305.3, dated Oct. 30, 2015 (6 pages).

Gudpod, "Gudpod/The New Pod Based Supplement Delivery", https://www.youtube.com/watch?v=FAj8uhN2rag; YouTube, published Mar. 3, 2016.

(56) References Cited

OTHER PUBLICATIONS

Susan Harmon, "Susan Elle Harmon at the Arnold with the Gudpod and Proactive Health Magazine", https://www.youtube.com/watch?v=UqM/M_N2to4; YouTube, published Mar. 11, 2016.
Gudpod, "Gudpod—The easiest way to take protein shakes", https://www.youtube.com/watch?v=XLiGuWyCIrc; Youtube, published Jul. 23, 2015.

* cited by examiner

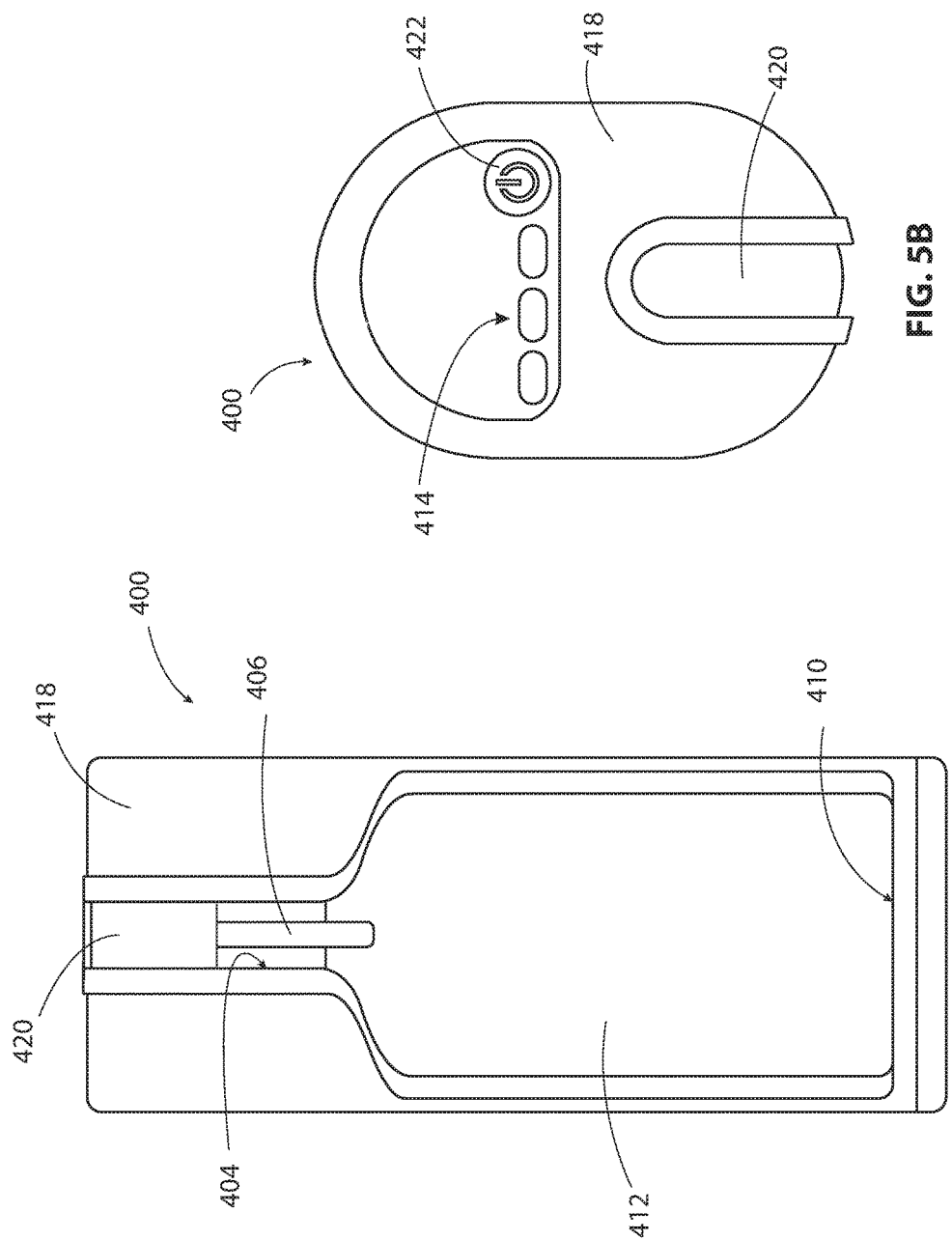

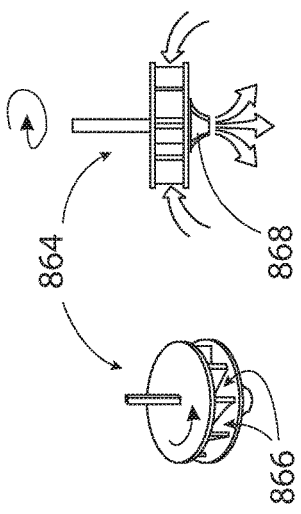
FIG. 13A  FIG. 13B
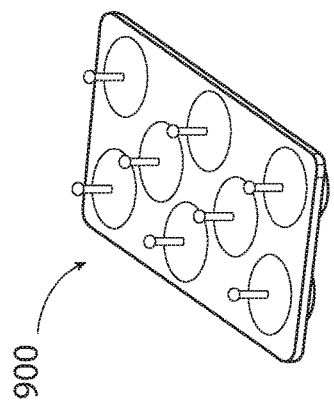
FIG. 14A  FIG. 14B  FIG. 14C
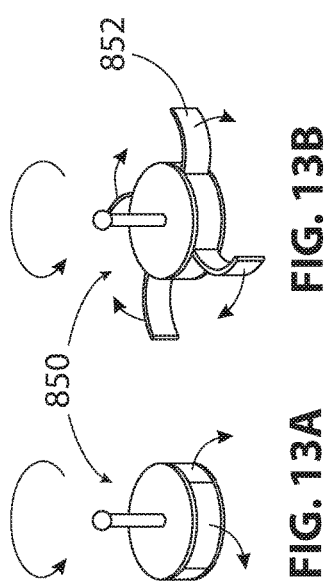
FIG. 15A  FIG. 15B
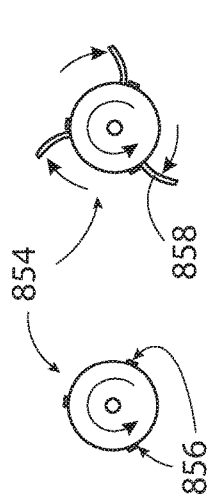
FIG. 16
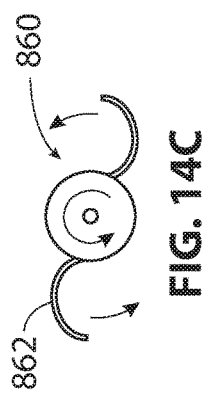

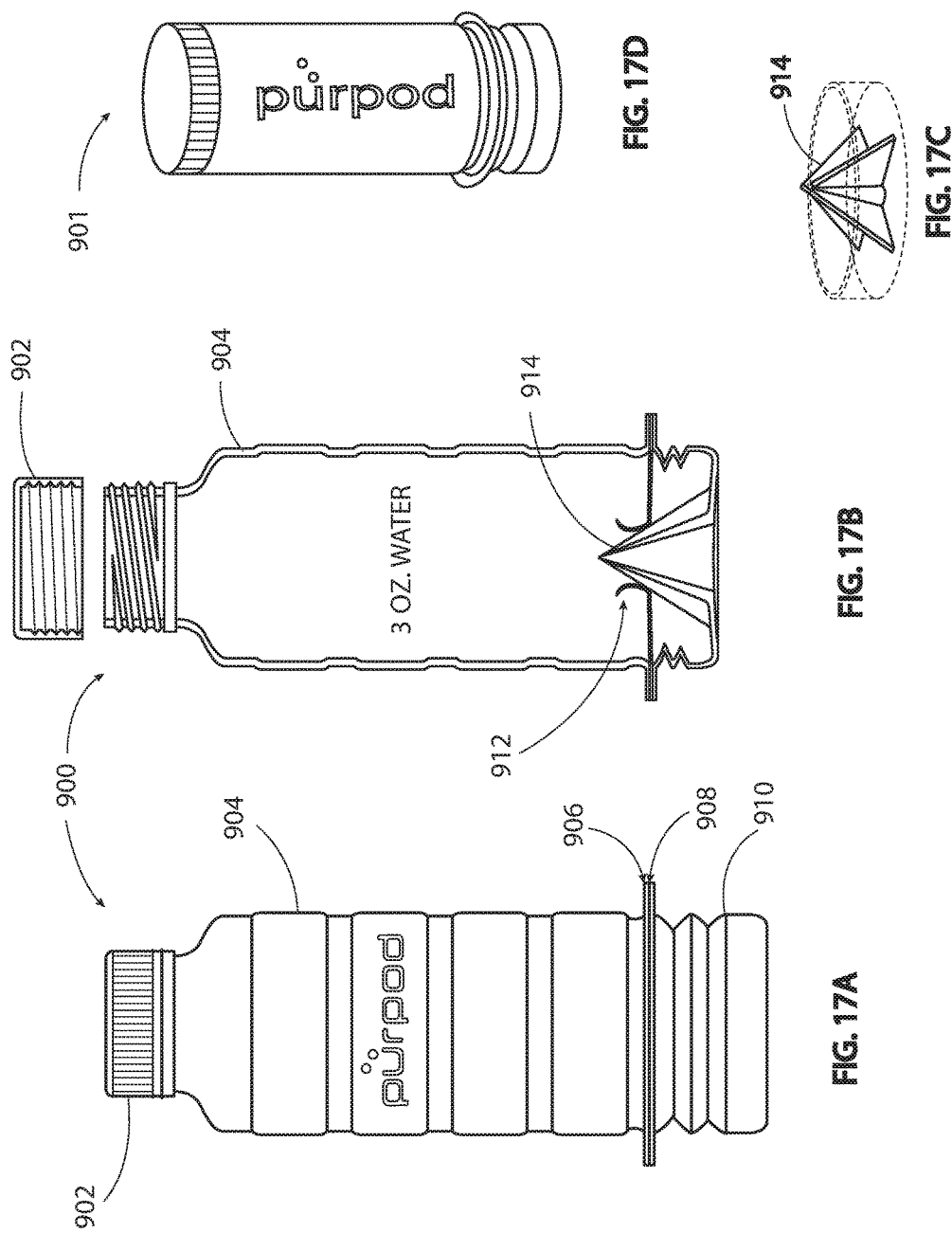

SYSTEM FOR MIXING BEVERAGES AND METHOD OF DOING THE SAME

CROSS-REFERENCE TO RELATED APPLICATIONS

This application is a continuation of prior U.S. application Ser. No. 14/381,521, filed Aug. 27, 2014, now allowed, which is the National Stage of International Application No. PCT/US2013/027982, filed Feb. 27, 2013, which claims the benefit of U.S. Provisional Application No. 61/604,410, filed Feb. 28, 2012, and U.S. Provisional Application No. 61/666,835, filed Jun. 30, 2012, each of which is hereby incorporated by reference herein in its entirety.

BACKGROUND OF THE INVENTION

Field of the Invention

The present invention relates to a nutraceutical compounding system and method therefore enabling quick preparation of a potable nutritional supplement. More particularly, the system consists of a durable housing base machine, a compounding module and a vessel containing an appropriate potable liquid; preferably the latter two elements as supplied by the user. The present invention relates to a customizable supplement beverage system, and method for personalizing the same to a particular user and for tracking of the same. The invention also relates to multi-compartment pods or containers for use with a trainable beverage mixing system.

Description of the Related Art

Industrial applications of trainable computer systems are known in the art, and typically include user-preference memorization. Also known are customized nutritional food and beverage dispensing systems, such as the one in U.S. Pat. No. 7,762,181 (Boland et al.), the entire contents of which are incorporated by reference.

As discussed in detail in Boland '181 a highly complex ingredient processor blends, cooks and prepares in individual dose system requiring continuous update and complex operational steps. Unfortunately, this reference fails to identify the trainable operation desired of the present invention, system and method. Also detriment to '181 is a substantially high cost requirement for a dispensing system, which prohibits individual-use systems.

Accordingly, there is a need for an improved nutraceutical compounding system and method of operating the same. Further, there is also a need to improve process efficiencies in tracking, identifying, dispensing and monitoring individually customizable supplement programs matched with a user's needs. There is also a need for a beverage compounding system including single compartment or multi-compartment containers for use therewith.

ASPECTS AND SUMMARY OF THE INVENTION

In response, the present invention provides a potable nutraceutical compounding system and optionally a method for the same. Provided is a nutraceutical beverage preparation system, and method for operating the same to a particular user and for operative tracking. Proposed additionally is an operative system for receiving and identifying a concentrate or supplement compounding module, for compounding the same prior to ingestion, and for tracking control factors relating to the same. Also proposed is a personalized supplement program that is nutraceutically based for user convenience.

A personalized supplement program solves (i) confusing online information, (ii) eliminates the need for expert salespersons at Vitamin stores, and (iii) saves costly doctor visits. But, a personalized supplement program does not eliminate the problems of taking 5-15 vitamins a day, such as, (i) too many pills to swallow, (ii) too many pill jars to open and sort, and (iii) a regiment hard to follow. What is needed is a unique in home delivery mechanism. A solution creates an easy, convenient and systematic way for the user to get their daily supply of vitamins and supplements. A solution provides customized vitamins for a user's needs and provides a convenient way for vitamin and supplement takers to consume their daily regiment. A solution provides clean drinking water free of disease causing contaminates. A solution does away with wasteful bottles that fill landfills. A solution does away with having to open multiple pill bottles and swallow vitamins and nutrients. Each pod provides personalized vitamin enriched water. Supplements are personalized for an individual's physiological needs: brain function, energy, metabolism, dietary, immune support, hormone support, cholesterol lowering, anti-oxidants, anti-inflammatory, weight management, mood enhancements, children's supplements, women's health, protein shake.

Also proposed are various compounding systems with process controls according to the preferred embodiment of the present invention with the system. Preferably, the systems comprise a durable base unit machine having a geometric interface(s) portion of which a separate compounding module can be fitted, and a vessel receiving area located below the vessel with a slip resistant bottom surface and a received vessel containing an appropriate potable liquid; preferably the latter two elements as supplied by the user. Alternatively, bottom surface may be a type of key-in surface to lock or otherwise secure the vessel in place during operation. The preferred compounding modules for use with the invention will be discussed in greater detail below. Optionally, the nutraceutical compounding system may have gained information from the compounding module to inform the durable base unit to a particular speed or frequency of agitation based upon the type, size or amount of nutraceutical being compounded.

Additionally, a user access code, fingerprint scan, retina scan or other known type of security control mechanism that is difficult to bypass, including software safety control, may be employed with the system, especially for the consumption of quantity-sensitive materials (i.e., iron, etc.) to prevent accidental overdose or cross contamination.

During operation, the compounding module has sealed within one or more chambers a dry or liquid nutraceutical supplement that can contain any of a wide variety of known nutritious elements. The compounding module may preferably have a translatable element(s) that unseals the supplement chamber and further becomes an agitation effector(s) for which motion (rotation, translation) of various characteristics (velocity, frequency, amplitude, rhythm) will be provided by the durable machine through one or more geometric interfaces that couple the compounding module to the durable machine.

The compounding module is unsealed autonomously through motions provided by durable base unit through the geometric interface(s). Once the liquid or dry contents of the compounding module have been released unto the potable liquid contained within the vessel the agitation effector(s) will be lowered into the liquid/supplement aggregate and agitated until a homogeneous nutraceutical mixture has been compounded for consumption as described above with respect to any of the systems disclosed herein. Alternatively, the nutraceutical within the chamber would be unsealed by motions conducted through the geometric interface(s). The potable liquid may be introduced into the supplement chamber by gravity, pressure (both higher and lower than ambient) or other means. The potable liquid may be introduced to the compounding module directly from the user, from a remote reservoir within the base unit, drawn from the user supplied vessel or other means. The flow of potable liquid introduced into the compounding chamber(s) may be controlled through the use of an orifice, or other means, to control the rate of introduction. The compounding action would take place substantially within the confines of the chamber by various means of agitation of the liquid/supplement aggregate (rotation, churning etc.); agitation energy provided to the module through the geometric interface(s). The compounded resulting beverage would then be directed into the user-supplied vessel by gravity or other means for later ingestion by the user.

When a cycle of compounding is complete the agitating element of the disposable is manipulated to manifest as complete a removal of as much of the extraneous compounded supplement so as to prevent any latent residue from dripping once the module has been removed for disposal. In one embodiment, wherein an agitation effector has been lowered into the potable liquid, the agitation effector is retracted from the liquid, although still within the confined perimeter of the compounding vessel, and rotated or shaken or otherwise urged to dislodge any latent residue to be discharged back into the vessel. The pod/container/agitator then rises upward from within vessel until entirely exposed so that the vessel may then be removed from the system and the compounded beverage ingested. Alternately, if the compounding module is not lowered into the vessel, during the compounding sequence, after initiation of the residue purge cycle, the module may be uncoupled from the geometric interface(s) and subsequently disposed of.

The empty disposable elements may now be decoupled from their geometric interfaces and discarded (recycled) as described above with respect to any of the systems disclosed herein.

In another embodiment, prior to unsealing, the durable machine may use sensing means to query the location of features of the vessel architecture and the height of the potable liquid meniscus relative to the durable base machine. This sensed knowledge will allow the machine to insure that the dry or liquid supplement will be released substantially above the user provided liquid. This knowledge will also allow the agitation element(s) to be positively lowered into the user provided potable liquid for final agitating and homogenization of the beverage.

Preferably, internal (not shown) to the durable base unit is an internal process controller unit (including suitable memory and processing units) optionally linked with an external communication control system. As will be understood by those of skill in the system operational arts, during any use, the system may be able to track the amount of nutraceutical disposable dispensements, total amount of supplement delivered and other operations. Additionally, in an optional embodiment, the communication control system may be able to communicate externally to process control system and data tables and with an automated delivery re-supply system, thereby permitting comprehensive benefit, use, and adaptation tracking for a user's health benefit. Additionally, the system may be able to operate commercial transactions on behalf of a user based upon designated user preferences.

Also proposed are various embodiments for compounding modules and some of their components that may be employed with the various compounding systems discussed above. For example, the compounding module may preferably have a translatable element(s) that unseal the supplement chamber and further become an agitation effector(s) for which motion (rotation, translation) of various characteristics (velocity, frequency, amplitude, rhythm) will be provided by the durable machine through one or more interfaces that couple the pod to the durable machine.

Optionally, a label may contain a 2D or 3D barcode, RFID or physical variable segments thereon for the compounding system to read, store and/or transmit information about the product being used and how it is compounded. Also optionally, a lid or cap is secured onto a portion of disposable part in a tamper resistant manner such that if the seal is broken the average user would notice.

Preferably, the compounding module is made substantially of recyclable materials. Also, the multiple parts of the compounding module are preferably embodied as an assembly all of which are created of the same material (e.g., polyethylene, etc.), which can be disposed of and recycled as an assembly. This is advantageous because it simplifies the waste stream through eliminating the identification and separation of unlike materials.

During operation, the disposable compounding module has sealed within one or more chambers a dry or liquid nutraceutical supplement that can contain any of a wide variety of known nutritious elements. The compounding module may preferably have a translatable element(s) that unseal the supplement chamber and further becomes an agitation effector(s) for which motion (rotation, translation) of various characteristics (velocity, frequency, amplitude, rhythm) will be provided by the durable unit through one or more geometric interfaces that couple the compounding module to the durable unit.

The compounding module is unsealed autonomously through motions provided by durable unit through the geometric interface(s). Once the liquid or dry contents of the compounding module have been released unto the potable liquid contained within the vessel the agitation effector(s) will be lowered into the liquid/supplement aggregate and agitated until a homogeneous nutraceutical mixture has been prepared for consumption as described above with respect to any of the systems disclosed herein.

When a cycle of compounding is complete the agitating element of the disposable compounding module is retracted from the liquid, although still within the confined perimeter of the compounding vessel, and rotated or shaken or otherwise urged to dislodge any latent residue to be discharged back into the vessel. The pod/container/agitator rises out from within vessel entirely so that the vessel may be removed from the system and the compounded beverage ingested. The empty disposable elements may now be decoupled from their geometric interface(s) and discarded (recycled) as described above with respect to any of the systems disclosed herein.

In another embodiment, prior to unsealing, the durable unit may use sensing means to query the location of features of the vessel architecture and the height of the potable liquid meniscus relative to the durable base unit. This sensed knowledge will allow the durable base unit to insure that the dry or liquid supplement will be released substantially above the user provided liquid. This knowledge will also allow the agitation element(s) to be positively lowered into the user provided potable liquid for final agitating and homogenization of the beverage.

In another embodiment, the potable liquid may be introduced from an onboard vessel like a reservoir that a permanent or detachable component of the durable base unit. In this embodiment, the durable base unit would introduce the liquid either directly into the compounding module or into a drinking vessel. Alternatively the liquid could be introduce by a pour-over introduced the durable base unit.

The above and other aspects, features and advantages of the present invention will become apparent from the following description read in conjunction with the accompanying drawings, in which like reference numerals designate the same elements. It will be understood that the embodiments discussed throughout this disclosure are optional, in that one may be pursued without departing from the scope and spirit of the others and that all are not required simultaneously though all are enabled within the understanding of those of skill in the art.

A mixing system comprises a movable mixing head comprising a back head movably connected to a front mixing head which includes a stirrer or mixer. During operation, after a pod or container is positioned securely on the surface, the mixing head is lowered such that the mixer or stirrer is engaged with an upper component of the pod or container. The user then selects the appropriate control for the desired frequency or speed of the mixing. Optionally, the front mixing head, which is connected to the back head via one or more movable arms such that the mixing arm moves about within the pod or container. Similarly, the mixing head may also optionally partially rotate (e.g., approximately 45%, 60%, 75%, etc.) again to move the mixing arm around within container or pod. Optionally, the mixing or agitation may additionally involve varying the depth of the engagement between the mixing paddle and the beverage, varying the duration of the mixing or agitation, reversing and/or oscillating the direction of the mixing (i.e., clockwise, counterclockwise, clockwise, etc.), and/or oscillating the depth of the engagement between the mixing paddle and the beverage (i.e., up, down, up, down, etc.).

Also proposed are various embodiments for two compartment mixing pods or containers and some of their components that may be employed with the various mixing systems discussed above. For example, a first embodiment of a pod or container for use with the mixing systems previously described, illustrates a two part pod, a nutritional supplement part and a housing part for containing filtered water, with a mixing paddle having radially projecting blades or fans and a upwardly projecting stem for interfacing with the disclosed mixing systems. Preferably, an upper part of the pod has a sealing cap having a sealing membrane or protective label there on. Optionally, a protective label may contain a 2D or 3D barcode thereon for the mixing system to read, store and/or transmit information about the product being used. Also optionally, a lid or cap is secured onto an upper portion of the housing part in a tamper resistant manner such that if the seal is broken the average user would notice.

During operation, once the pod or container is positioned securely into the mixing system, a mixing head will lower the mixing arm or stirrer down onto the upper portion or protective label of the pod or container. The mixing system will continue to move mixing arm downward until the lower end of the mixing arm connects or otherwise engages with the upper end of a stem of the paddle such that when the mixing arm spins, the paddle will rotate at the same speed and/or frequency. The mixing arm continues to apply downward pressure on the stem until a lower tip of the paddle punctures the sealing membrane which had been maintaining the nutritional supplement or vitamin away from the water. Once the sealing membrane is punctured the nutritional supplement or vitamin spills into the water and the mixing arm continues to apply downward pressure on the stem until the paddle is sufficiently submerged to a distance within the water to adequately and completely mix the water and nutritional supplement as described above with respect to any of the mixing systems disclosed herein. Once sufficiently mixed, the mixing arm rises out from within the container so that the container may be removed from the mixing system. Optionally, the mixing arm and/or stem may comprise a mechanism or may be configured in such a way that they become securely engaged and that when the mixing arm is removed from container, it removes the paddle as well. Optionally, the paddle may remain within the container and be disposed of along with the container once all of the liquid mixture is gone.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings.

FIG. 5A is a front plan view of a compounding system's durable base unit with process controls according to an alternate embodiment of the present invention.

FIG. 5B is a top plan view of the compounding system's durable base unit shown in FIG. 5A.

FIG. 13A is a perspective view of an embodiment for an alternative compounding module in a closed position for use in compounding the nutraceutical contents during operation of the compounding system.

FIG. 13B is a perspective view of the compounding module spinning mechanism shown in FIG. 13A shown in the open position.

FIG. 14A is a perspective view of a further embodiment for a compounding module in a closed position having three agitation elements for use in compounding the nutraceuticals during operation of the compounding system.

FIG. 14B is a perspective view of the compounding module spinning mechanism shown in FIG. 14A shown in the open position.

FIG. 14C is a perspective view of the compounding module spinning mechanism of the type shown in FIG. 14A shown in the open position and adaptively having only two agitation elements.

FIG. 15A is a perspective view of an embodiment for a compounding module spinning mechanism for use in compounding the contents of a compounding module during operation of the compounding system.

FIG. 15B is a perspective view of the compounding module spinning mechanism shown in FIG. 15A further indicating the flow of liquid during spinning in order to compound the contents of the compounding module.

FIG. 16 is a perspective view of one embodiment of how the compounding module may be packaged for proper sealing and safety.

FIG. 17A is a front plan view of yet another alternative embodiment for a two part pod for use with the mixing system in accordance with the invention.

FIG. 17B is an exposed cross-sectional view of the two part pod shown in FIG. 17A further showing the membrane piercing component upon compression of the two part pod.

FIG. 17C is a perspective view of one embodiment of the membrane piercing component for use with the invention.

FIG. 17D is a perspective view of an alternate embodiment of the two part pod shown in FIGS. 17A-B.

DETAILED DESCRIPTION OF THE PREFERRED EMBODIMENTS

Figure 1:
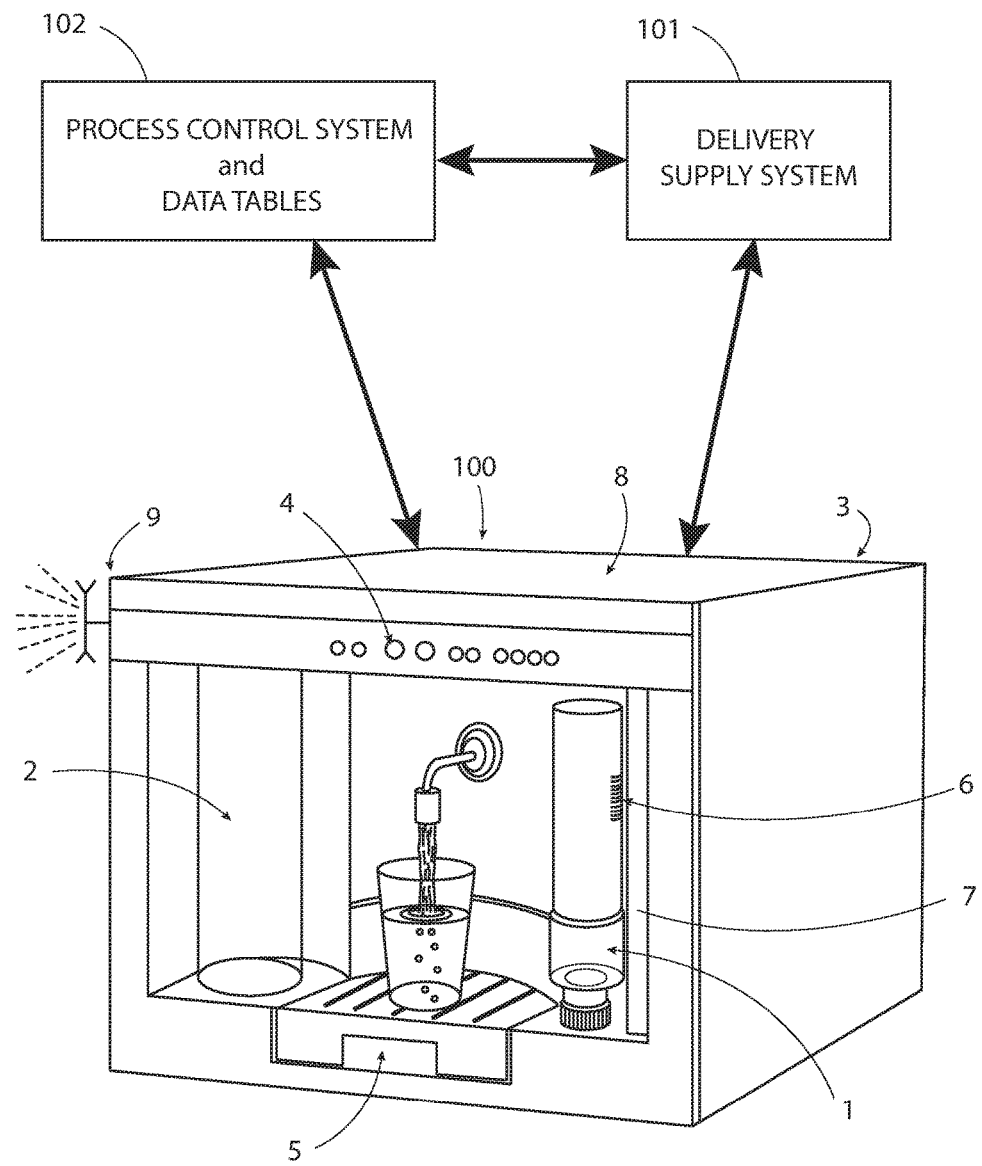
FIG. 1 is a descriptive illustration of one alternative embodiment of the proposed system.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to alternative embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Referring generally to FIG. 1, it will be understood that the proposed compounding system 100 optionally includes an operable process control system and suitable data tables 102 that are in operative communication with a delivery and re-supply system 101 for management of the nutraceutical compounding system and components thereof. As will be understood from the exemplary illustration an optional data communication loop, provided by communication controls, process control units (PCU's), is provided by illustrated arrows, but this will be understood by those of skill in the art to be operable over any known telecommunication process for receipt, manipulation, and delivery of information, and order and for tracking physical delivery of later described items herein.

Within system 100 it will be understood there are non-limiting options, provided here as examples, including a user-unit operable for receipt of a concentrate or supplement container 1 and a supply of a dilutant (e.g., water, coffee, tea, milk, carbonated beverages, any hot or cold fluid, or any other suitable fluid) 2, with operable power input access 3 (at rear of unit) and a process control system 4 containing suitable operative controls for achieving the goals of the proposed system (for example, on/off, volume control, temp, control, mixing proportions, optional weight-stage for dispensing tracking, user identification, etc.). Both container 1 and dilutant 2 may be in multi-use, continuous, or single-use sizes or any adaptation thereof. Further, dilutant 2 may be remotely supplied (e.g., via water supply) for example.

Additionally noted is an optional dispensing station unit 5 for supporting a volume to receive a mixture of dilutant 2 and concentrate 1 under mixing conditions controlled by control system 4. Optionally, an individual tracking identifier or bar code, RFID, etc. 6 is provided on each concentrate/supplement container 1 and there is positioned an associated reader 7 for detecting and receiving identification/use information from identifier 6 during an installation and use of container 1. Internally (not shown) is the location unit is an internal process controller unit 8 (including suitable memory and computerized processing units and controllers) linked with an optional external communication control system, shown as an operably enabled wireless antenna 9. As will be understood by those of skill in the system operational arts, during any use, system 100 will be able to track individual uses, individual dispensments, particular mixing proportions, total supplement delivery and other operations and much else as discussed throughout the disclosure. Additionally, in an optional embodiment, the communication control system 9 will be able to communicate externally to process control system and data tables 102 and with delivery supply system 101, thereby permitting comprehensive benefit, use, and adaptation tracking for a user's health benefit. Additionally, system 100 will be able to optionally re-order, and operate self-triggering commercial transactions on behalf of a user based upon designated user preferences.

Regarding process control system and data tables 102, it will be understood that these include a comprehensive process control units to receive, track, organize, and select from informational data bases involving comprehensive user identifications, complete medical and query information and user goals, a complete selection with all parameters of dilutants and also all supplements, minerals, pharmaceuticals etc. that may be selected based upon user-parameters.

Figure 2A:
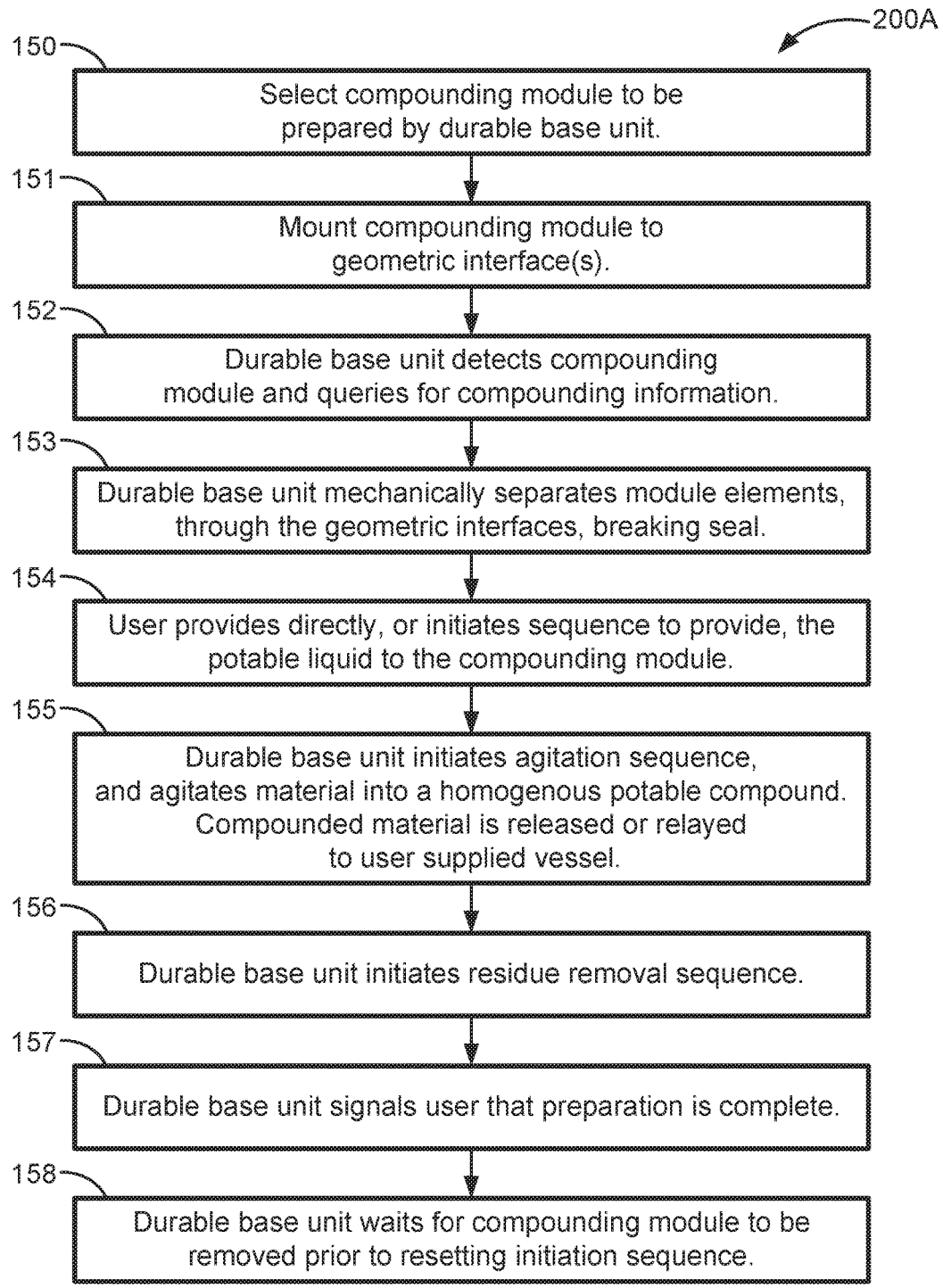
FIG. 2A is an illustrative flow chart of a nutraceutical preparation system external compounding.

Referring now to FIG. 2A, an adaptive nutraceutical preparation system external compounding method 200A is illustrated. In one method process, in a first step 150 a user selects a compounding module to be prepared by a durable base unit. In a step 151, the compounding module is mounted to the module by an adaptive geometric interface(s). In a step 152, the durable base unit detects the compounding module and queries for compounding information. In a step 153 the durable base unit mechanically separates module elements, through the geometric interfaces, breaking seal. In a step 154, the user provides directly, or initiates a sequence to provide, the potable liquid to the compounding module. Next, in a step 155, the durable base unit initiates agitation sequence, and agitates material into a homogeneous potable compound. Compounded material is released or relayed to user-supplied vessel. The durable base unit initiates residues removal sequence in a step 156. The durable base unit signals user that preparation is complete in a step 157. Next, in a step 158, the durable base unit waits for compounding module to be removed prior to resetting initiation sequence.

Figure 2B:
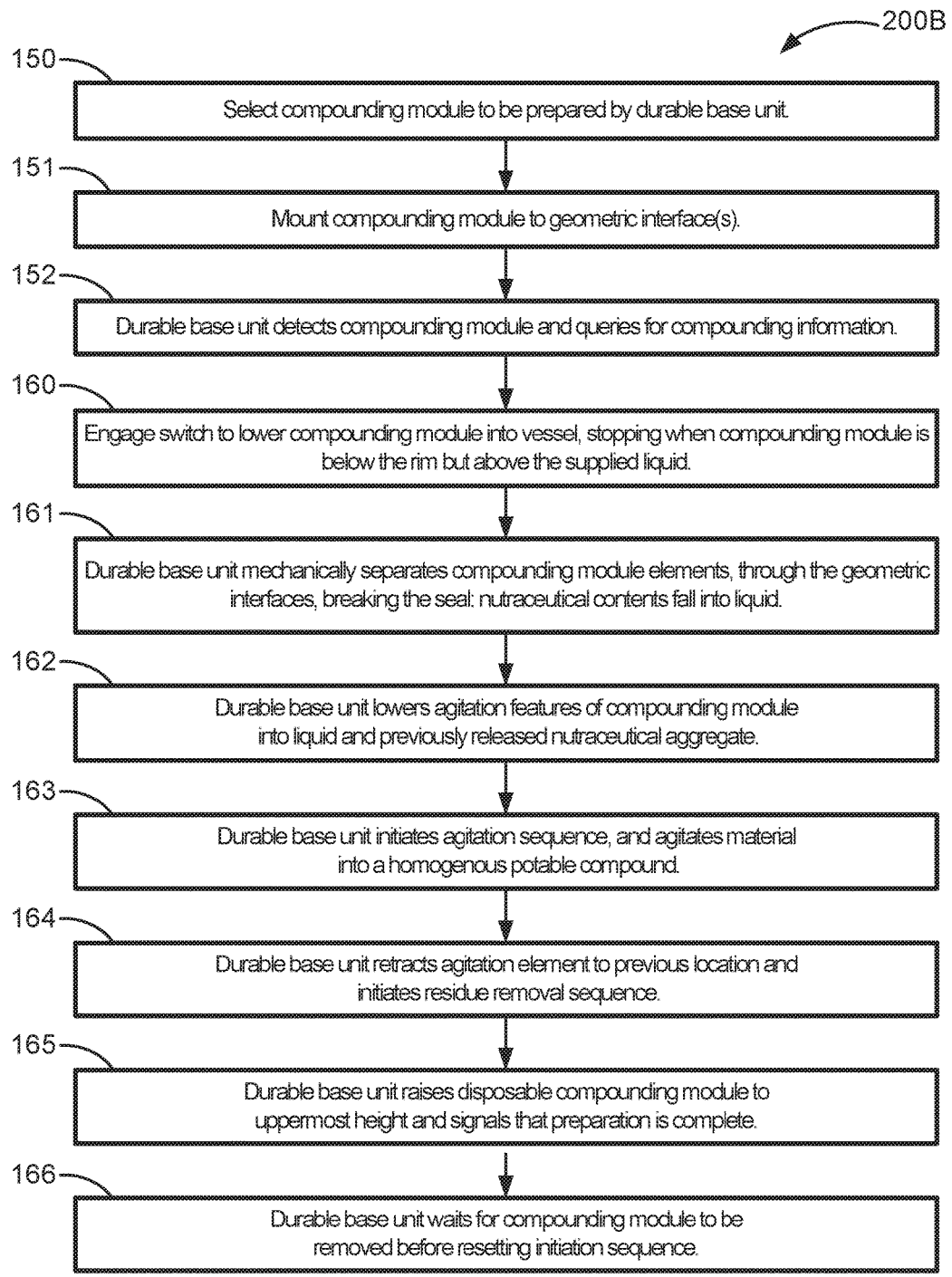
FIG. 2B is an illustrative flow chart a nutraceutical preparation non-sensing system.

Referring now to FIG. 2B, a nutraceutical preparation non-sensing system method 200B is illustrated. In the first step 150, a compounding module is selected by the user to be prepared by the durable base unit. The compounding module is then mounted to the geometric interface(s) in step 151. In a step 152, the durable base unit detects compounding module and queries for compounding information. In a step 160, an engage switch is activated to lower the compounding module into vessel, stopping when compounding module is below the rim but above the supplied liquid. The durable base unit mechanically separates compounding module elements, through the geometric interfaces, breaking the seal, the nutraceutical contents fall into liquid in a step 161. Durable base unit lower agitation features of compounding module into liquid and previously release nutraceutical aggregate in a step 162. The durable base unit initiates agitation sequence and agitates material into a homogeneous potable compound in step 163. The durable base unit retract agitation element to previous location and initiates residue removal sequence in a step 164. The durable base unit raises disposable compounding module to uppermost height and signals that preparation is complete in a step 165. Durable base unit waits for compounding module to be removed before resetting initiation sequence in a step 166.

Figure 2C:
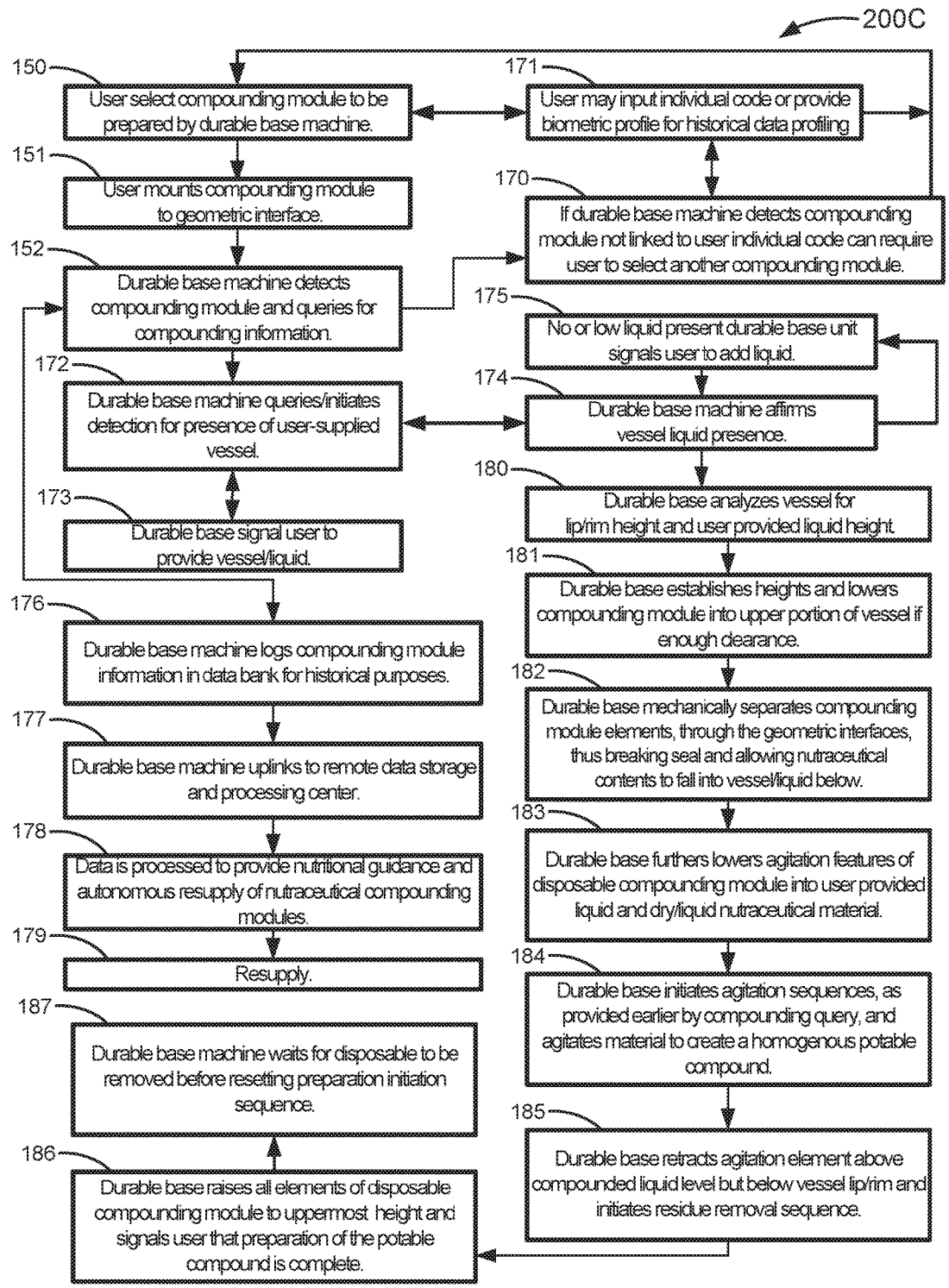
FIG. 2C is an illustrative flow chart of one method according to one embodiment of the proposed system.

Referring now to FIG. 2C, wherein an operative and optional method 200C of the proposed system is illustrated. In a first step 150 a user selects a compounding module of user preferences and needs to be prepared by durable base unit. The user may input individual code or provide biometric profile for historical data profiling in a step 171. The user mounts in step 151 the compounding module to the geometric interface. The durable base unit detects compounding module and queries for compounding information in step 152. If durable base unit detects compounding module it not linked to user's individual code the durable base unit can require the user to select another compounding module in step 170. When the durable base unit accepts the compounding module the durable base unit logs compounding module information in data bank for historical purposes in a step 176. Durable base machine uplinks to remote data storage and processing center in step 177. The data is then processed to provide guidance and autonomous resupply of nutraceutical compounding modules in step 178, and through a resupply option step 179. If the durable base unit detects the compounding module is correct for the user profile the durable base machine queries/initiates detection for presence of user-supplied vessel in step 172. If no vessel is present the durable base unit signals user to provide vessel/ liquid in step 173. If the durable base unit affirms vessel is present but no or insufficient liquid is present the durable base unit signals user to provide liquid in step 175. If durable base affirms vessel/liquid is present in step 174, the durable base analyzes in step 180 vessel for lip/rim height and user provided liquid height. Durable base establishes height and lowers compounding module into upper portion of vessel or enough clearance in step 181. Durable base mechanically separates compounding module elements, through the geometric interfaces, thus breaking the seal and allowing nutraceutical contents to fall into liquid and vessel below in step 182. The durable base further lowers agitation features of disposable compounding muddle into user provided liquid and dry/liquid nutraceutical material in step 183. Durable base initiates agitation sequences, as provide earlier by compounding query, and agitate material to create a homogeneous potable compound in step 184. The durable base then retracts agitation element above compounded liquid level but below vessel lip/rim and initiates residual removal sequence in step 185. Then the durable base raises all elements of the disposable compounding module to uppermost height and signals user that preparation of the potable compound is complete in step 186. The durable base machine then waits for disposable to be removed before resetting preparation initiation sequence in step 187.

Figure 2D:
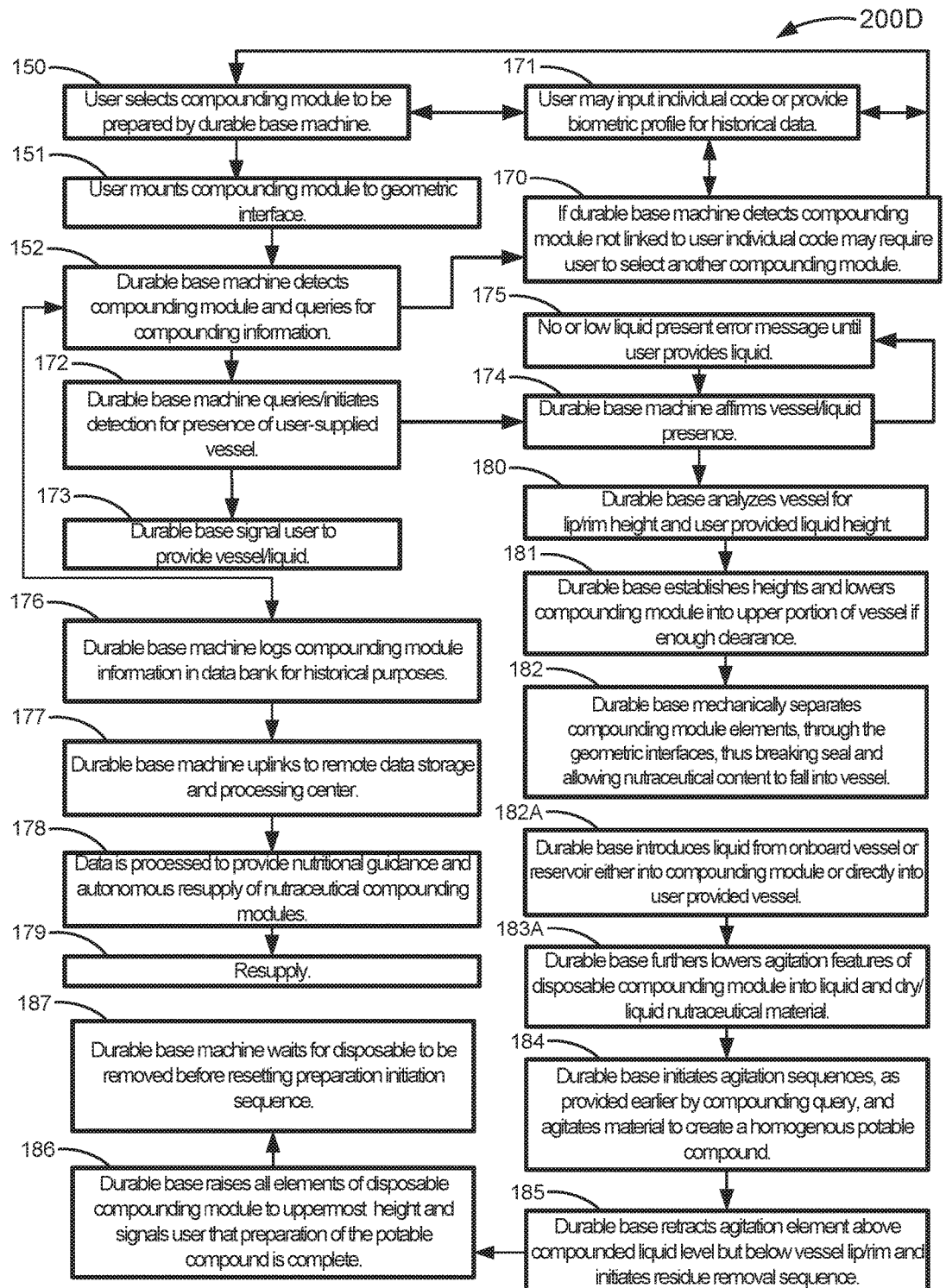
FIG. 2D is an illustrative alternative flow chart of method with on board vessel or reservoir.

An alternative to the above mentioned FIG. 2C is an operative and optional method 200D of the proposed system method illustrated in FIG. 2D. In a first step 150 a user selects a compounding module of user preferences and needs to be prepared by durable base unit. The user may input individual code or provide biometric profile for historical data profiling in step 171. The user mounts the compounding module to the geometric interface in step 151. The durable base unit detects compounding module and queries for compounding information in step 152. If durable base unit detects compounding module it not linked to user's individual code in step 170, the durable base unit can require the user to select another compounding module. When the durable base unit accepts the compounding module the durable base unit logs compounding module information in data bank for historical purposes in step 176. Durable base machine uplinks in step 177 to remote data storage and processing center. The data is then processed in step 178 to provide guidance and autonomous resupply of nutraceutical compounding modules via a resupply step 179. If the durable base unit detects the compounding module is correct for the user profile the durable base machine queries/initiates detection for presence of user-supplied vessel in step 172. If no vessel is present the durable base unit signals user to provide vessel in step 173. The durable unit also confirms the presence of liquid in the durable base unit's onboard vessel or reservoir if the liquid is not present or low the durable base unit will signal the user to add liquid in step 175. When the durable base unit affirms in step 174 the user provided vessel is present and the durable base unit onboard vessel or reservoir contains liquid then the durable base unit analyzes the vessel for lip/rim height in step 180. Durable base establishes height and lowers compounding module into upper portion of vessel for enough clearance in step 181. Durable base mechanically separates compounding module elements, through the geometric interfaces, thus breaking the seal and allowing nutraceutical contents to fall into vessel below in a step 182. The durable base unit introduces liquid from the onboard vessel or reservoir either directly into the compounding module or the user provided vessel in a step 182A. The durable base further lowers agitation feature of disposable compounding module into liquid and dry/liquid nutraceutical material in step 183A. Durable base initiates agitation sequences in step 184, as provide earlier by compounding query, and agitate material to create a homogeneous potable compound. The durable base then retracts agitation element above compounded liquid level but below vessel lip/rim and initiates residual removal sequence in step 185. Then the durable base raises all elements of the disposable compounding module to uppermost height and signals user that preparation of the potable compound is complete in step 186. The durable base machine then waits, step 187, for disposable to be removed before resetting preparation initiation sequence.

Figure 2E:
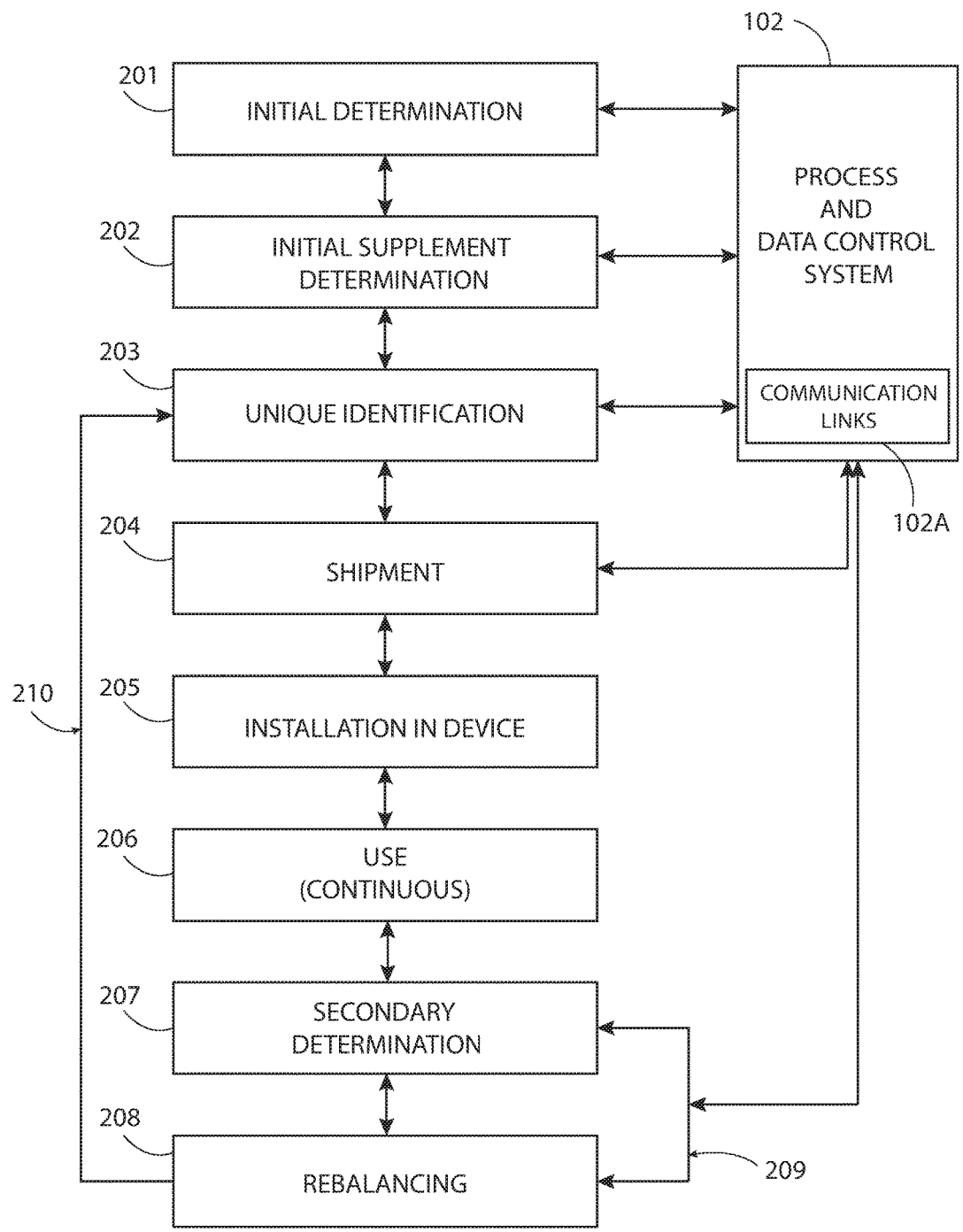
FIG. 2E is an illustrative flow chart of one alternative method according to one embodiment of the proposed invention.
Figures 3A, 3B:
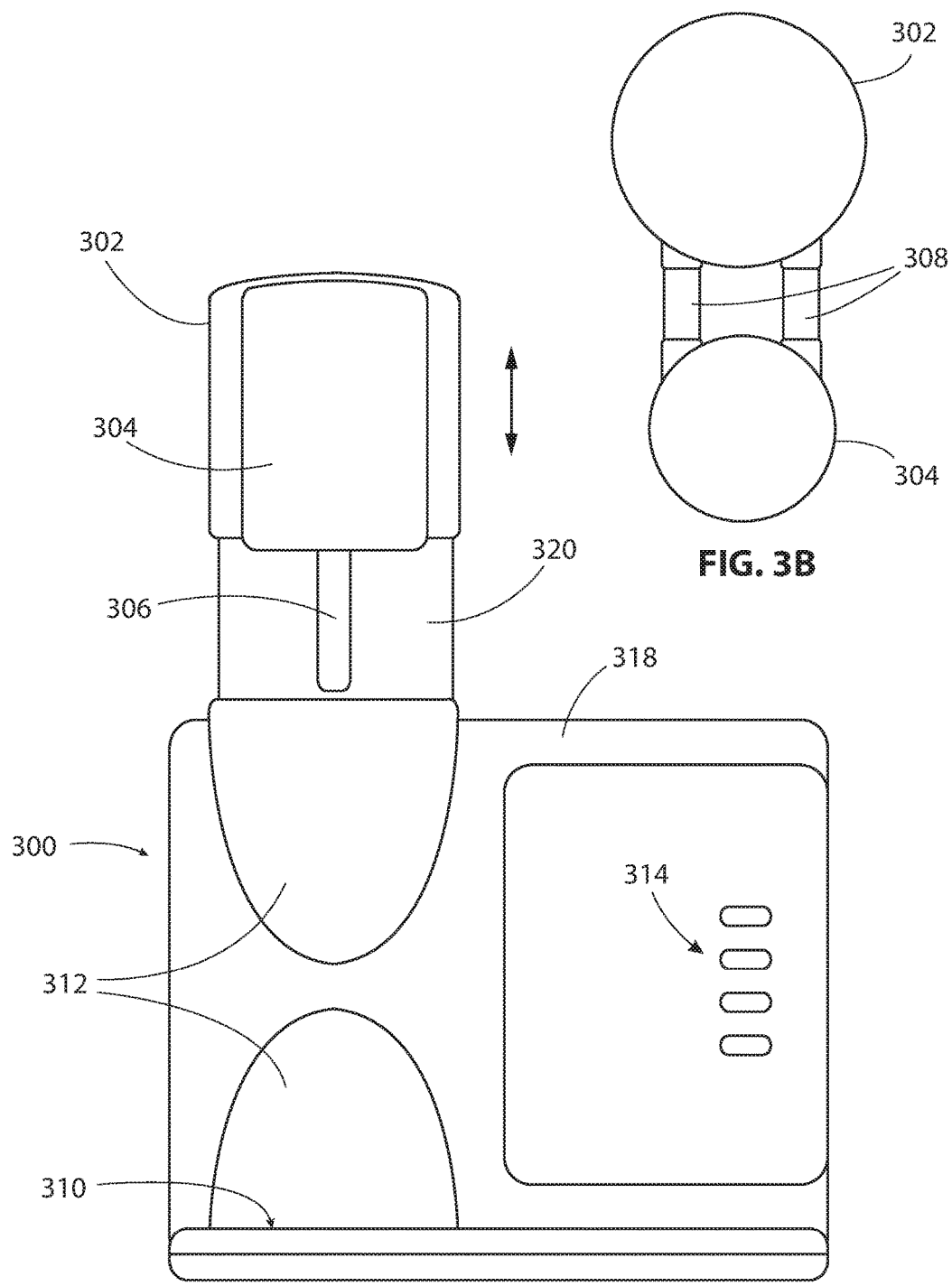
FIG. 3A is a front plan view of the nutraceutical compounding system's durable base unit with process controls according to one alternative embodiment of the present invention with the system in the raised or open position.
FIG. 3B is a top plan view of the nutraceutical compounding system's durable base unit shown in FIG. 3A.
Figure 3C:
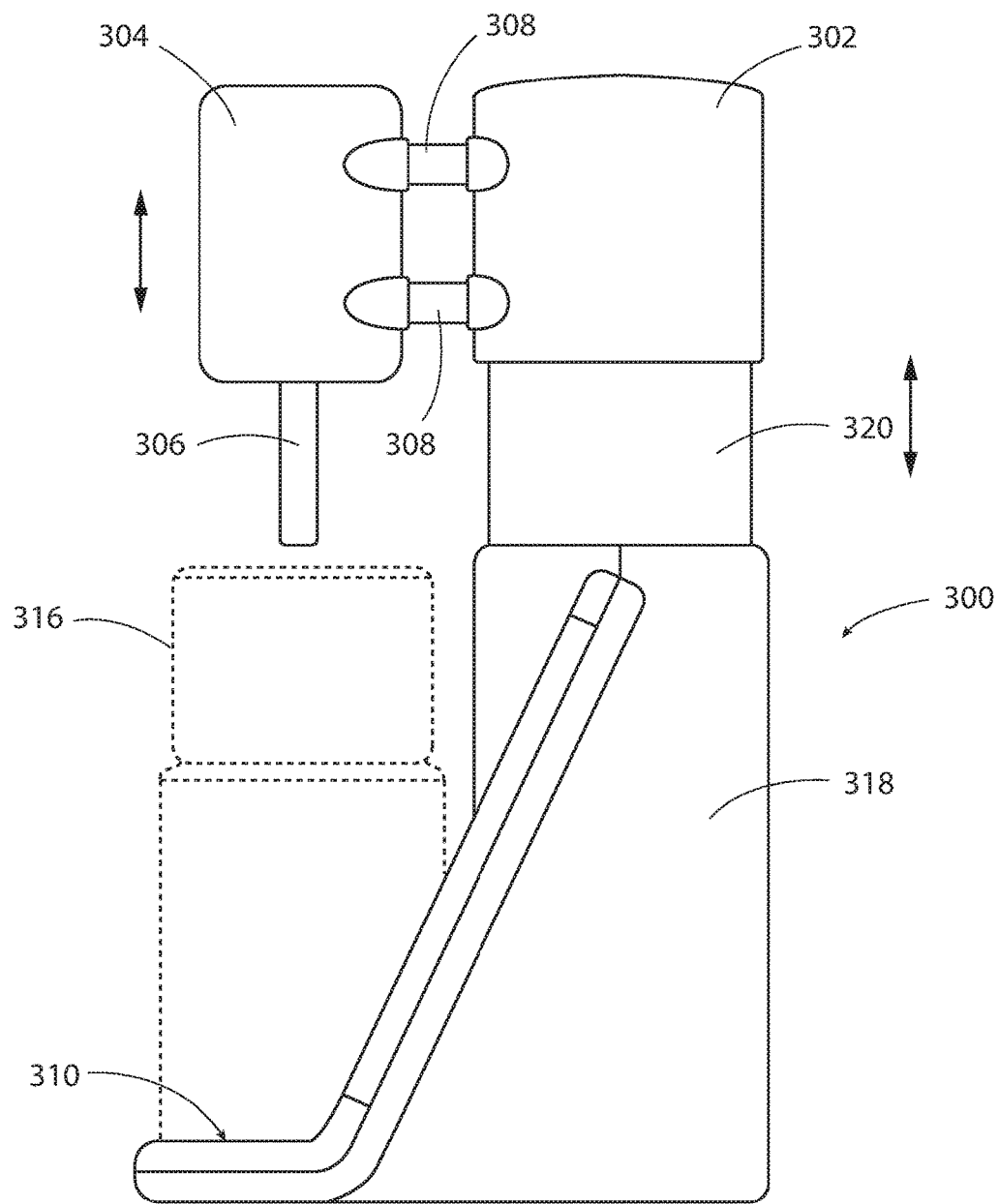
FIG. 3C is a side view of the compounding system's durable base unit shown in FIG. 3A.
Figure 4A:
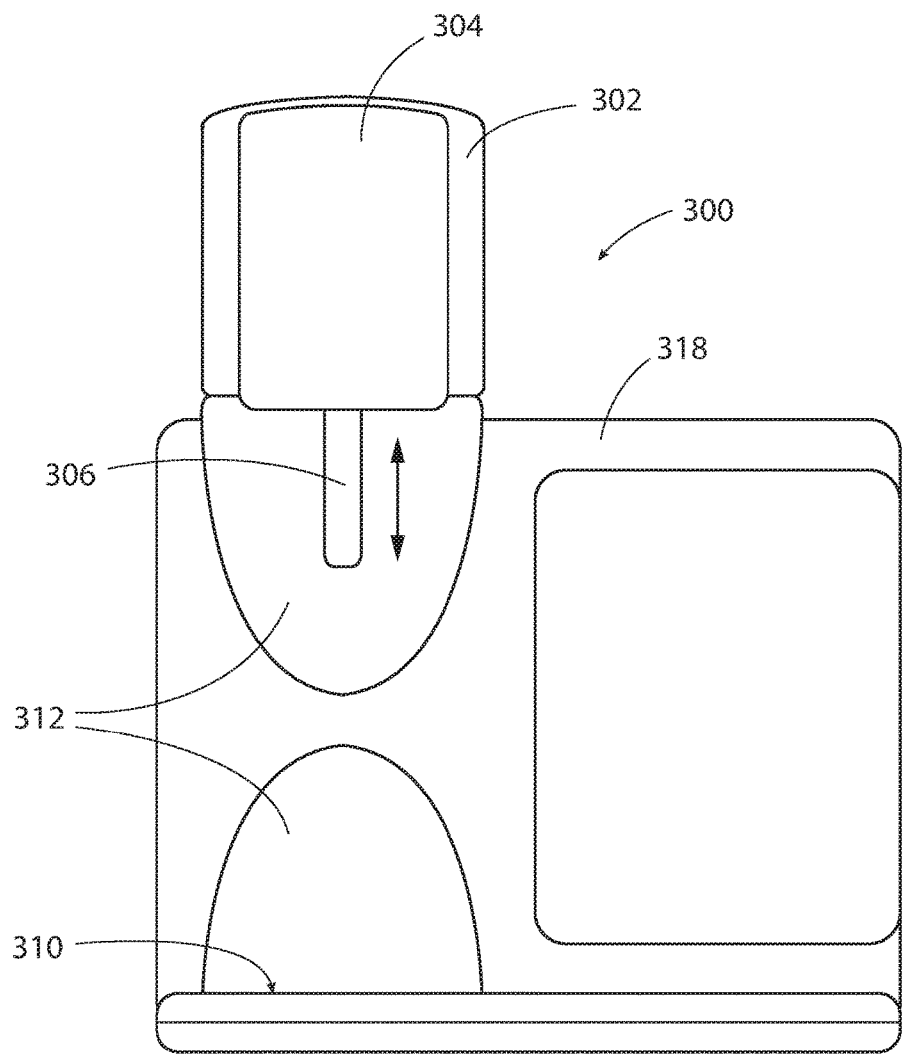
FIG. 4A is a front plan view of the compounding system's durable base unit shown in FIG. 3A with the durable base unit in the lowered or closed position.
Figure 4B:
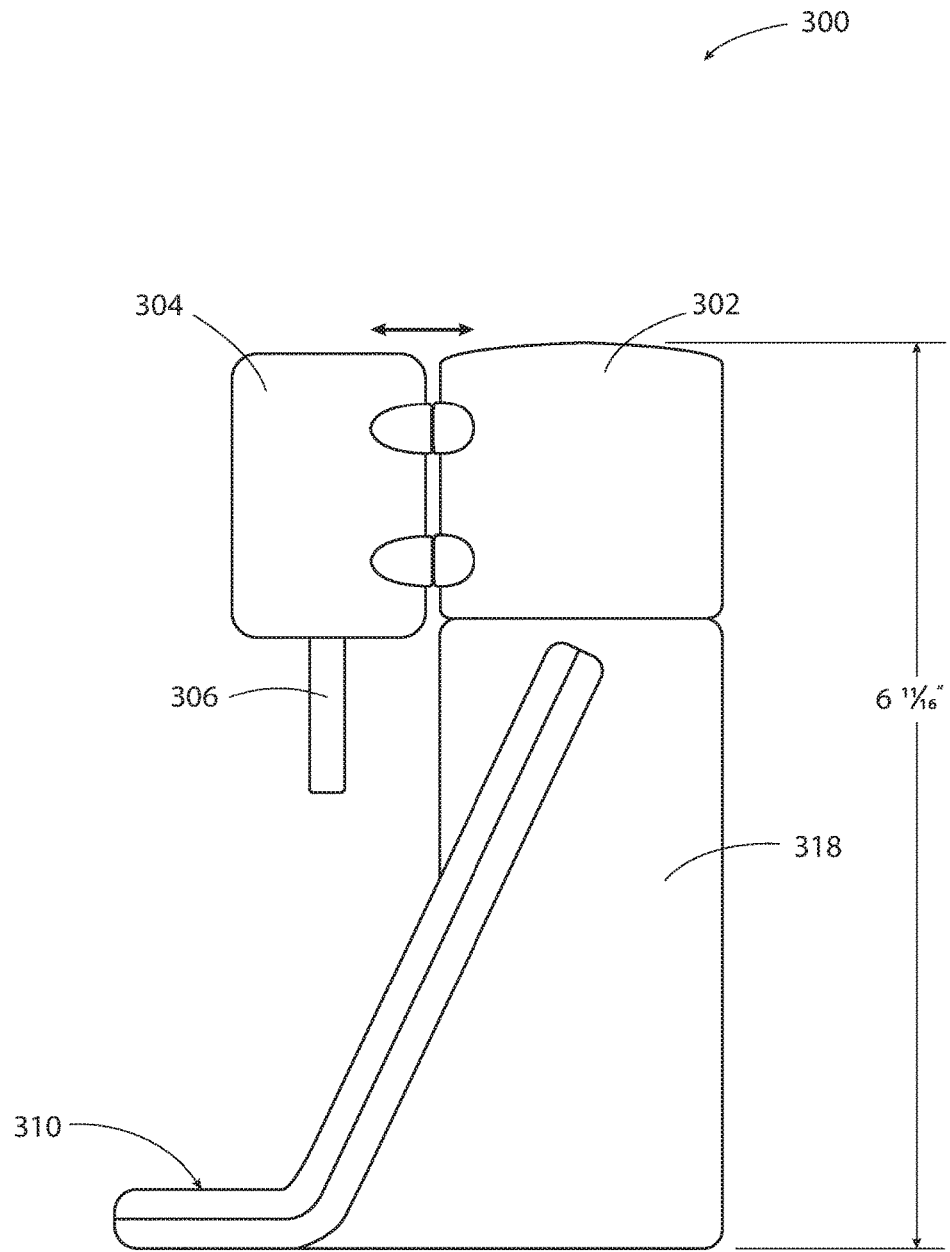
FIG. 4B is a side view of the compounding system's durable base unit shown in FIG. 4A.

Referring now to FIG. 2E, wherein an operative and optional method of the proposed system is illustrated. In a first step 201 an initial determination is provided of user preferences and needs and includes (in each step noted hereafter) links with process and data control unit and system 102 containing operative communication links 102A. Such determination step may include questionnaires (multiple) following family history, health concerns, health history, desired outcomes (weight loss, muscle gain, medical treatment support, diabetes, wound healing, cancer treatment support, etc., without limitations thereto).

Following initial questionnaire and detail information for each individualized users an initial recommended user-unique supplement determination is made in a step 202 linked with a unique identification step 203 and via process and data control system 102, a supplement concentrate product is created, packaged, and shipped in a combined step 204 to a user for installation in a device 205. Device system 100 recognizes the unique identification and conducts local controls and monitoring as discussed elsewhere through continuous use steps 206 for a designated period of time (user determined, medically determined etc.) until a desire to conduct a secondary determination step 207 is reached.

In step 207 a link with the unique identification is made via path 210 to process control 102 and the historic data is stored in data tables therewith. Additional steps in a rebalancing step 208 are conducted that would include modifying the initial supplement determination step 202 and crafting a replacement or secondary supplement via a path 209 shown also linked with process control 102. In this matter, during a rebalancing step a new individually identifiable supplement is packaged, shipped, delivered, linked with the system and dispensed therefrom.

It will be recognized that this process of initial determination and later rebalancing may be repeated without limit so as to provide a continual trainable process unique to each user's needs.

Further, it will be understood that the entire contents of U.S. Pat. No. 7,762,181, herein incorporated by reference further provides details regarding operable communication, data management, shipping, user-identification and product-identification technologies as recognized by those of skill in the art. Thus, for a non-limiting example where data is 'sent' or 'recorded' this will be understood to incorporate all known ways (wired, wireless, encrypted, open, random-access memory, bubble-memory, cloud-based etc.). For example, the current process control system and data tables could be cloud-based, or located on an enterprise-type system with server modules. Finally, it will be understood that the full historic health, medical, vitamin, pharmaceutical, and nutrition data available and is used to guide supplement or concentrate determination.

It will be understood that the phrase dilutant supply or dilutant may be any potable fluid material that is not the nutraceutical concentration, thereby allowing a dilution of the concentration during a use compounding preparation. The dilutant may be any suitable fluid for human consumption, and by way of non-limiting example the dilutant may be water or another combination of components (e.g., coffee, tea, milk, pharmaceutical combinations etc., without limitation).

It will be understood that the phrase nutraceutical, indicates a portmanteau of the words "nutrition" and "pharmaceutical", and as used herein is a food or food product that reportedly provides health and medical benefits, including the prevention and treatment of disease, and that this food or food product may be of any kind, but is preferably in the form of a dry or fluid concentrate intended for combination with prior to ingestion by an end user. Nothing herein will limit the interpretation to requiring a pharmaceutical product. It will also be understood that nutraceutical may additionally include those compounds, vitamins, flavorings, minerals, drugs, or pharmaceutical compositions (without limit to any) that are believed to have a physiological benefit or provide protection against chronic disease. With recent developments in cellular-level nutraceutical agents the proposed use will be understood as non-limiting and is to be broadly interpreted to include any complementary and alternative therapies now known or later developed.

Turning next to FIGS. 3A-C and 4A-4B, shown is an exemplary compounding system 300 with process controls according to the preferred embodiment of the present invention with the system in the raised or open position (FIGS. 3A-C) and in the lowered or closed position (FIGS. 4A-B) of the durable base unit. Preferably, the system comprises a housing body 318 having a first compounding module that attaches to the unit via a geometric interface(s) and a vessel 316 that will be placed on a slip resistant bottom surface 310. Alternatively, bottom surface 310 may be a type of key-in surface to lock or otherwise secure the vessel or second container 316 in place during operation. Alternatively the unit may have a carve out of the base such that the vessel sits on the same surface as the unit or on a base not attached to the unit. The preferred compounding module for use with the invention will be discussed in greater detail below. Optionally, the compounding system 300 may have process controls 314 to autonomously control or alert the user to a particular speed or frequency of the mixing based upon the type of nutraceutical being used or the size or amount being used. Compounding system 300 further comprises movable mixing head 320 comprising back head 302 movably connected to front mixing head 304 which includes a geometric interface 306 that couples the compounding module to the durable unit.

During operation, a vessel 316 is positioned securely on surface 310, mixing head 320 is coupled to the compounding module by a geometric interface that couples it to the durable unit and then lowers (see FIGS. 4A-B) the compounding module into the vessel. The head 320 may have a sensor to locate the vessel and determine the height of the fluid or liquid in the vessel such that compounding module is lowered into the open container or vessel 316. The head 320 may use the identifier on the compounding module to select the rate of agitation for the proper introduction of that content into the vessel. Optionally, front mixing head, is connected to back head 302 via movable arms 308 such that mixing arm 306 moves about within the open vessel 316. Similarly, the mixing head 320 may also optionally partially move/rotate (e.g., approximately 45% or 60%) again to move mixing arm 306 around within container or pod 316. Alternatively the compounding module may be lowered to rest on top of the vessel.

Preferably, internally (not shown) to the compounding system 300 is an internal computer process controller unit (CPU) (including suitable memory and processing units) optionally linked with an external communication control system. As will be understood by those of skill in the system operational arts, during any use, system 300 may be able to track individual uses, dispensements, particular mixing proportions, total supplement delivery and other operations. Additionally, in an optional embodiment, the communication control system may be able to communicate externally to process control system and data tables and with delivery re-supply system, thereby permitting comprehensive benefit, use, and adaptation tracking for a user's health benefit. Additionally, system 300 may be able to re-order, and operate commercial transactions on behalf of a user based upon designated user preferences.

Figure 5C:
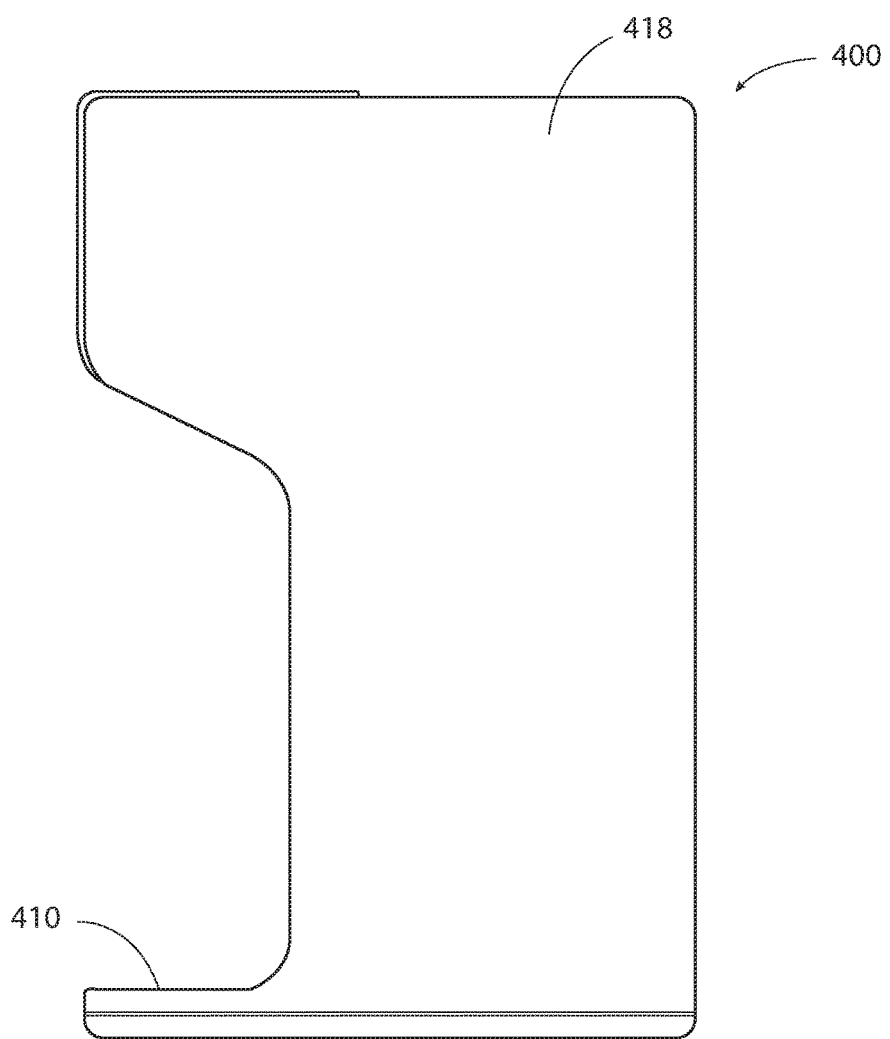
FIG. 5C is a side view of the compounding system's durable base unit shown in FIG. 5A.

Referring next to FIGS. 5A-C, shown is a compounding system 400 with process controls according to an alternate embodiment of the present invention. Preferably, the system comprises a housing body 418 having a compounding module and a receiving open vessel (not shown) that is held in the receiving portion 412 with a slip resistant bottom surface 410. Alternatively, bottom surface 410 may be a type of key-in surface to lock or otherwise secure the pod or container in place during operation. Alternatively the unit may have a carve out of the base such that the vessel sits on the same surface as the unit or on a base not attached to the unit. The preferred compounding module for use with the invention will be discussed in greater detail below. Optionally, the compounding system 400 may have power control switch 422 and controls 414. Additionally the compounding module may have an identifier to determine a particular speed or frequency of the mixing based upon the type of nutraceutical or other health product being used or the size or amount being used. Optionally, a user access code, fingerprint scan, retina scan or other known type of security control mechanisms that are difficult to bypass, including software safety controls, may be employed within the system, especially for the consumption of quantity-sensitive materials (i.e., Iron, etc.) to prevent accidental overdose. Compounding system 400 further comprises movable mixing head 420 movably connected within housing 418 and is connected on its bottom surface to stirrer or mixing arm 406. Additionally, each user that interfaces with the device will provide a unique container or open vessel so there is no cross contamination of nutraceuticals from one user to the next.

During operation, a compounding module is coupled to the mixing head and secured by a geometric interface(s) and the compounding module is lowered into the open potable vessel by the mixing head 420. The compounding system knowing the content of the compounding module because of the identifier then selects the appropriate control 414 for the desired frequency or speed of the mixing. As will be discussed further below, the mixing arm 406 may optionally have fans or blades which extend radially from mixing arm 406 to aid in the mixing process. Optionally, the mixing head 420 may also move up and down as well as partially rotate within housing 418 again to move mixing arm 406 around within the container or module.

As discussed above, internal (not shown) to the compounding system 400 is preferably an internal process controller unit (including suitable memory and processing units) optionally linked with an external communication control system. In addition, a barcode reader or scanner 404 may be included to read and transmit information from the product being used to the internal process controller unit. As will be understood by those of skill in the system operational arts, during any use, system 400 may be able to track individual uses, dispensements, particular mixing proportions, total supplement delivery and other operations. Additionally, in an optional embodiment, the communication control system may be able to communicate externally to process control system and data tables and with delivery re-supply system, thereby permitting comprehensive benefit, use, and adaptation tracking for a user's health benefit. Additionally, system 400 may be able to re-order, and operate commercial transactions on behalf of a user based upon designated user preferences.

Figure 6A:
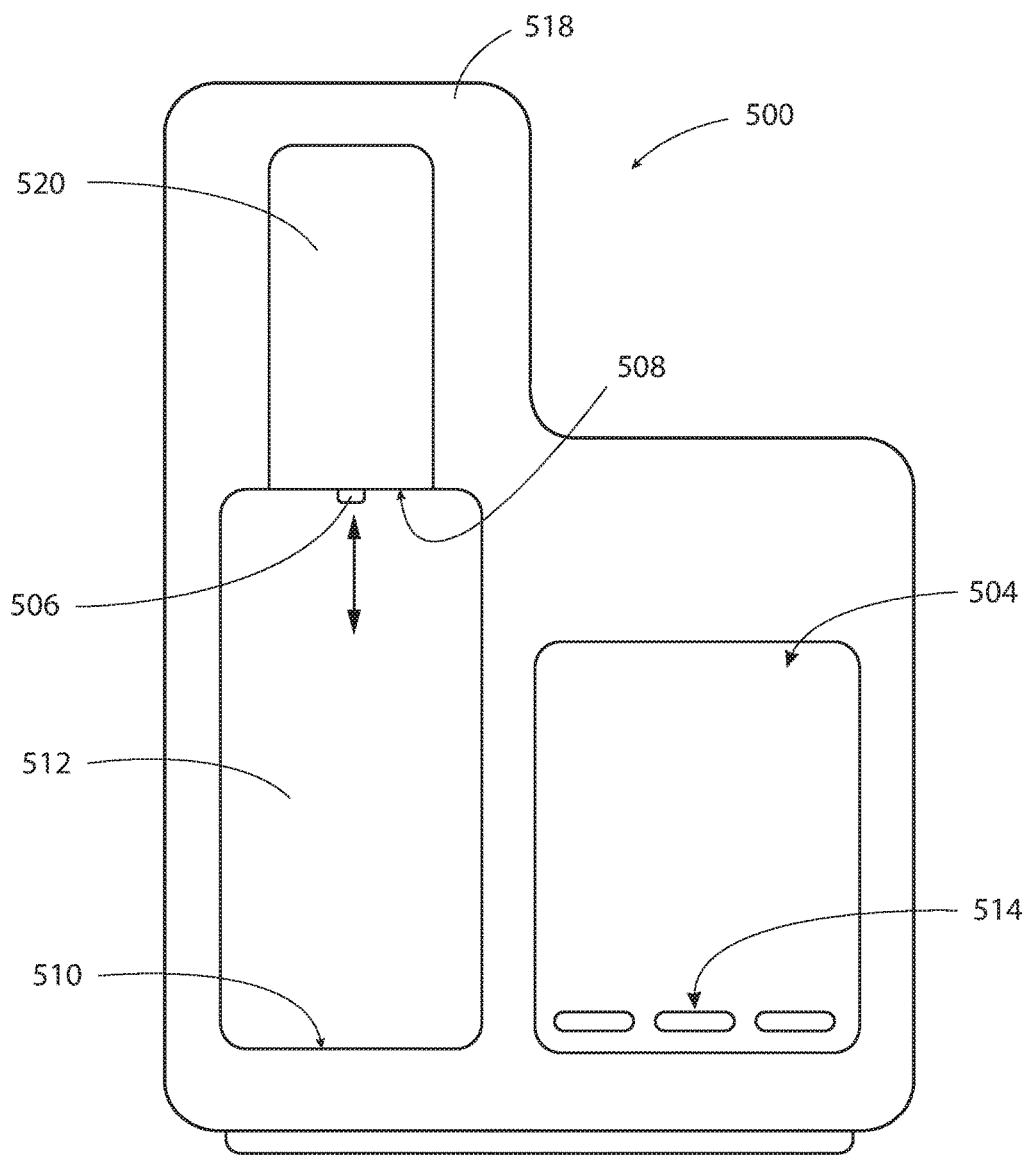
FIG. 6A is a front view of a compounding system's durable base unit with process controls according to another alternate embodiment of the present invention.
Figure 6B:
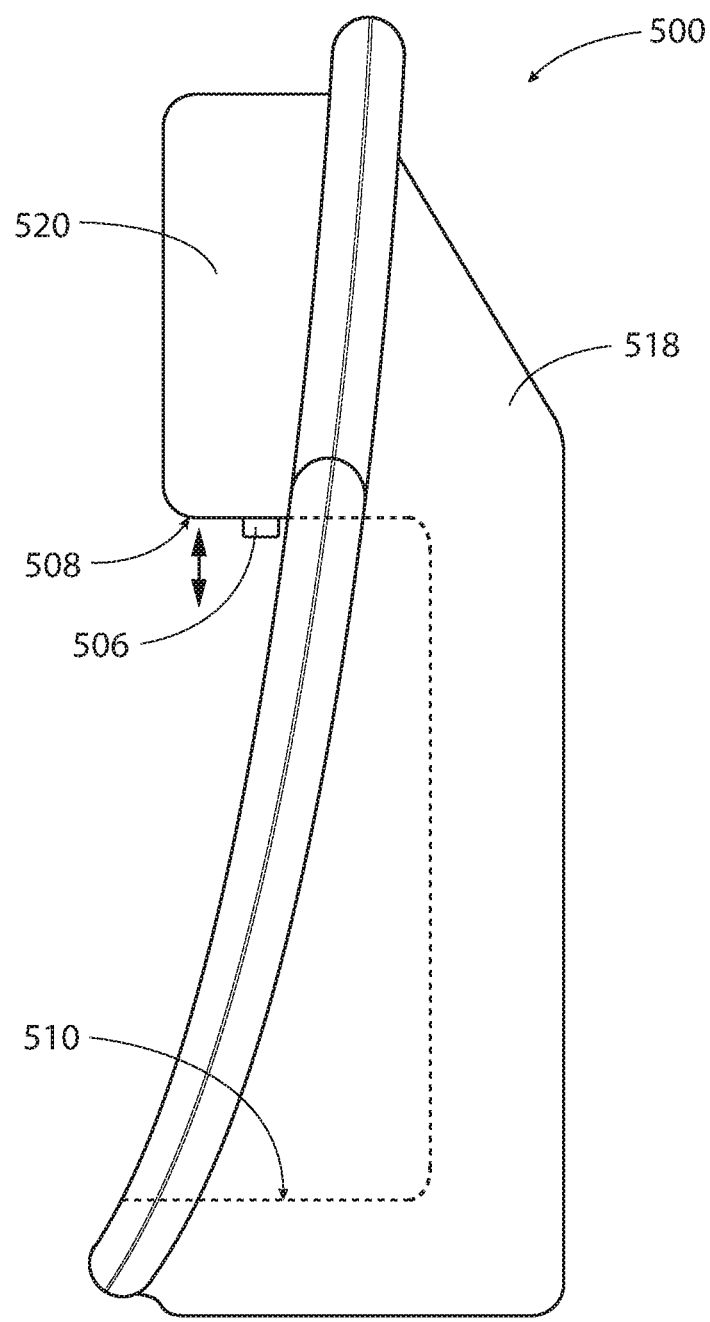
FIG. 6B is a side view of the compounding system's durable base unit shown in FIG. 6A.

Turning next to FIGS. 6A-B, shown is the compounding system 500 with controls according to yet another alternate embodiment of the present invention. Preferably, the system comprises a housing body 518 having a compounding module and an open vessel that is engaged in 512 with a slip resistant bottom surface 510. Alternatively, bottom surface 510 may be a type of key-in surface to lock or otherwise secure the pod or container in place during operation. Alternatively the unit may have a carve out of the base such that the vessel sits on the same surface as the unit or on a base not attached to the unit. The compounding modules for use with the invention will be discussed in greater detail below. Optionally, the compounding system 500 may have a power control switch and process controls 514 to identify for or alert the user to a particular speed or frequency of the mixing based upon the type of nutraceutical or other health product being used or the size or amount being used. Alternatively, an LED or other touch based electronic screen 504 may be employed to provide all the control menus and options for the user of the system. Compounding system 500 further comprises mixing head 520 connected to housing 518 directly above container receiving portion 512 and is connected to stirrer or mixing arm with geometric interface 506.

During operation, an open, potable liquid container or vessel is positioned securely on surface 510, mixing head 520 engages with the compounding module and the mixing arm by a geometric interface and/or stirrer 506 into the contents of the open vessel. The device reading the identifier on the compounding module then selects the appropriate control 514 (or using other control pad 504) for the desired frequency or speed of the mixing. As will be discussed further below, the mixing head 520 may also move up and down as well as partially rotate within housing 518 again to move mixing arm 506 around within the container or pod.

As discussed above with the other embodiments, internal (not shown) to the mixing system 500 is preferably an internal process controller unit (including suitable memory and processing units) optionally linked with an external communication control system. In addition, a barcode reader or scanner, beam interuptor, microswitches, RFID scanner or other types of scanning means 508 may be included to read and transmit information from the compounding module being used to the internal process controller unit. As will be understood by those of skill in the system operational arts, during any use, system 500 may be able to track individual uses, dispensements, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 500 may be able to re-order, and operate commercial transactions on behalf of a user based upon designated user preferences.

Figure 7A:
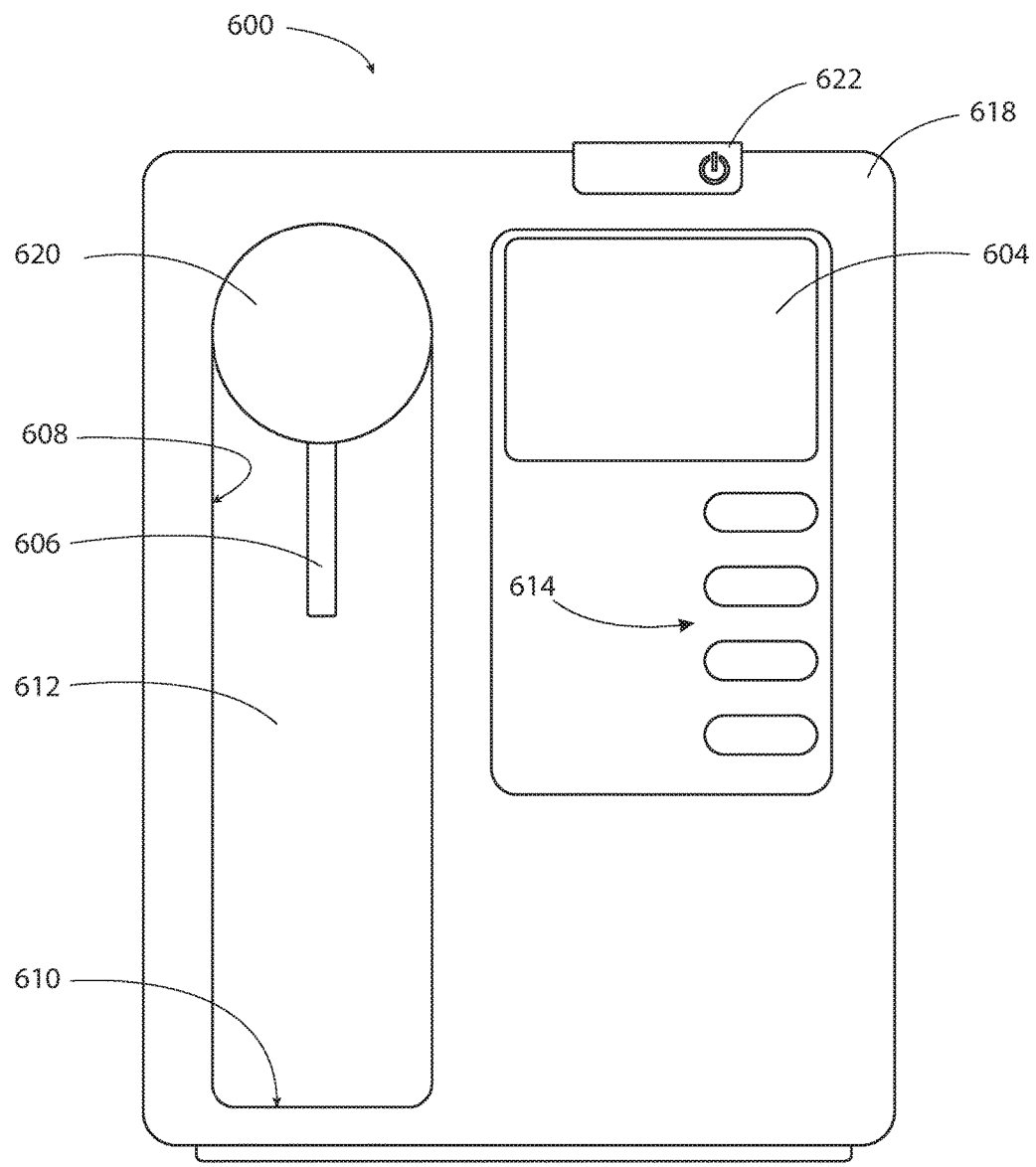
FIG. 7A is a front plan view of a compounding system's durable base unit with process controls according to another alternate embodiment of the present invention.
Figure 7B:
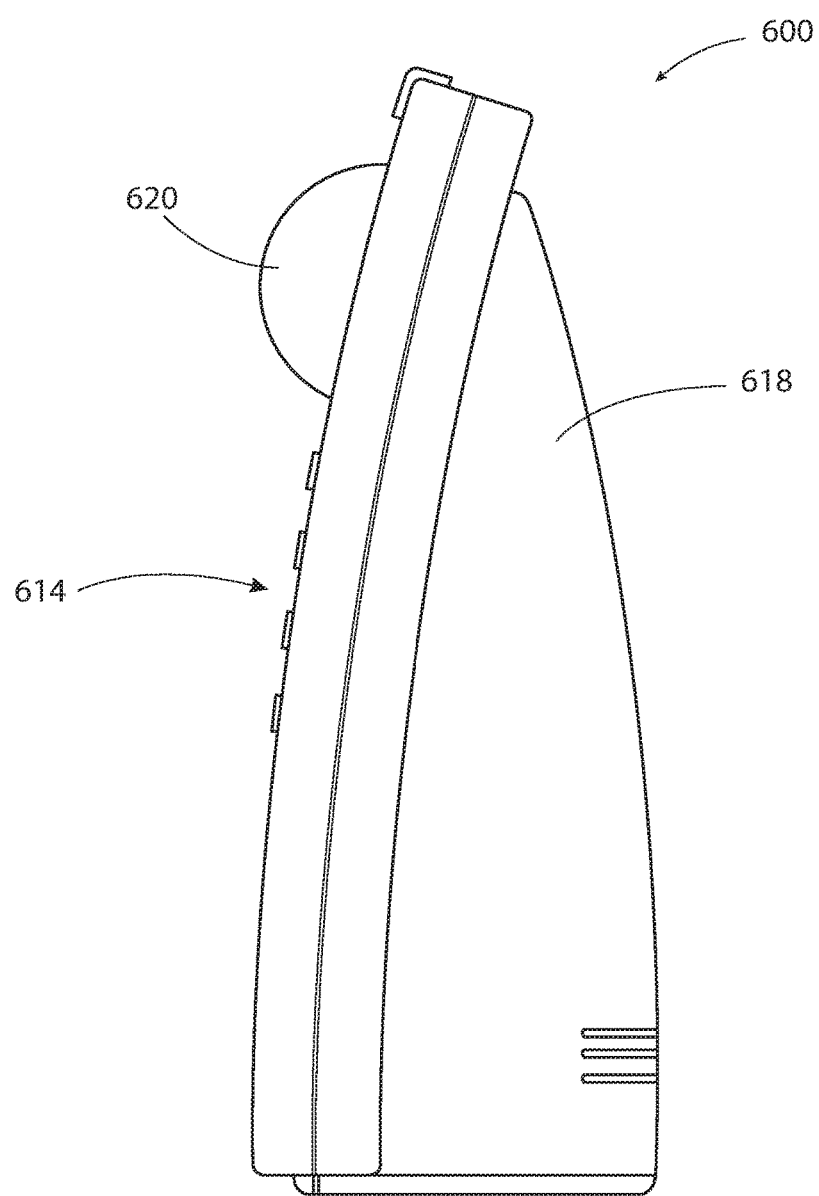
FIG. 7B is a side view of the compounding system's durable base unit shown in FIG. 7A.

Turning next to FIGS. 7A-B, shown is the compounding system 600 with process controls according to still yet another alternate embodiment of the present invention. Preferably, the system comprises a housing body 618 having a vessel receiving portion 612 with a slip resistant bottom surface 610. Alternatively, bottom surface 610 may be a type of key-in surface to lock or otherwise secure the pod or container in place during operation. Alternatively the unit may have a carve out of the base such that the vessel sits on the same surface as the unit or on a base not attached to the unit. The compounding modules for use with the invention will be discussed in greater detail below. Optionally, the compounding system 600 may have a power control switch 622 and process controls 614 to adjust the user to a particular speed or frequency of the mixing based upon the type of nutraceutical or other health product being used or the size or amount being used. Alternatively, an LED or other touch based electronic screen 604 may be employed to provide all the control menus and options for the user of the system. Compounding system 600 further comprises mixing head 620, in this embodiment a ball-shaped head, connected to housing 618 directly above container receiving portion 612 and is connected to stirrer or mixing arm 606.

Again, during operation, after a compounding module is positioned securely on surface 610, mixing head 620 lowers agitator stirrer 606 into the contents of the vessel. The user then selects the appropriate control 614 (or using other control pad 604) for the desired frequency or speed of the mixing. The compounding system 600 may optionally employ a locking mechanism or child safety lock to prevent a child from accidentally selecting an adult size or speed. Optionally, the mixing head 620 may also move up and down as well as partially rotate within housing 618 again to move mixing arm 606 around within the compounding module.

As discussed above with the other embodiments, internal (not shown) to the compounding system 600 is preferably an internal process controller unit (including suitable memory and processing units) optionally linked with an external communication control system. In addition, a barcode reader or scanner, beam interuptor, microswitches, RFID scanner or other types of scanning means or 608 may be included to read and transmit information from the product being used to the internal process controller unit. As will be understood by those of skill in the system operational arts, during any use, system 600 may be able to track individual uses, dispensments, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 600 may be able to re-order, and operate commercial transactions on behalf of a user based upon designated user preferences.

Figure 8A:
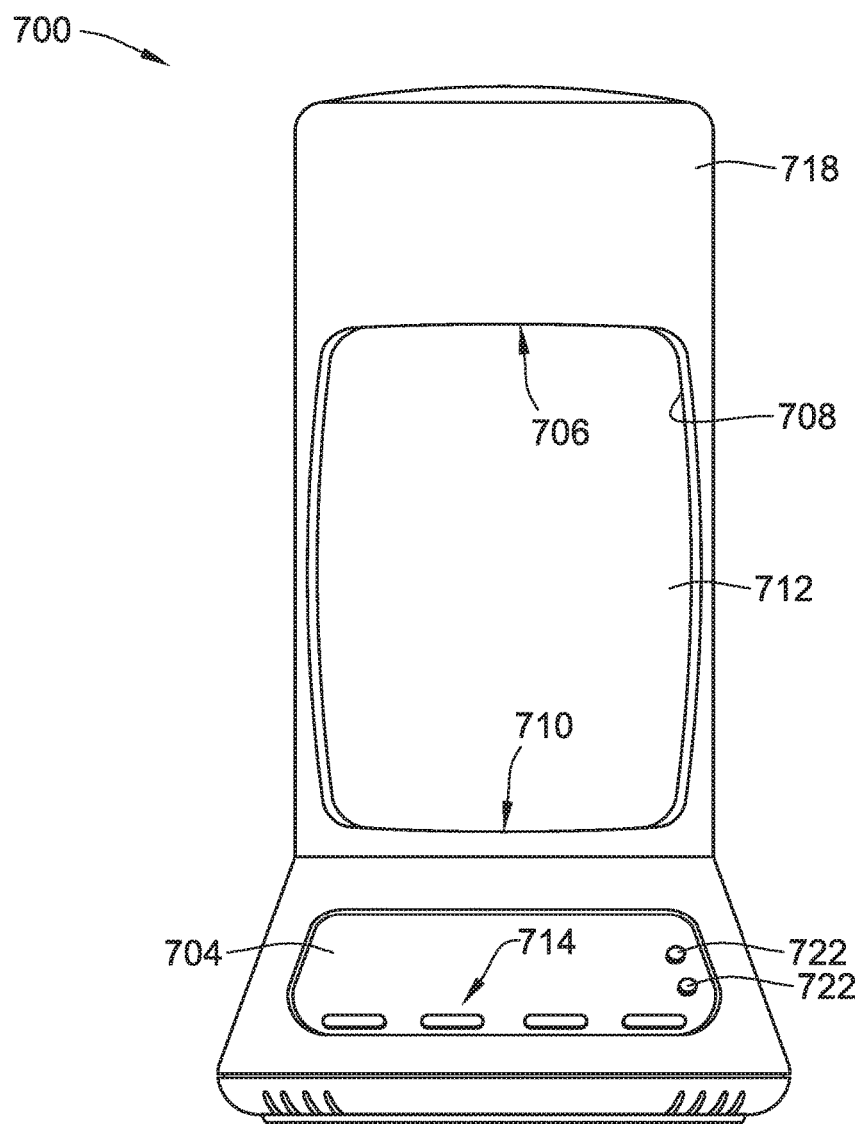
FIG. 8A is a front plan view of a compounding system's durable base unit with process controls according to another alternate embodiment of the present invention.
Figure 8B:
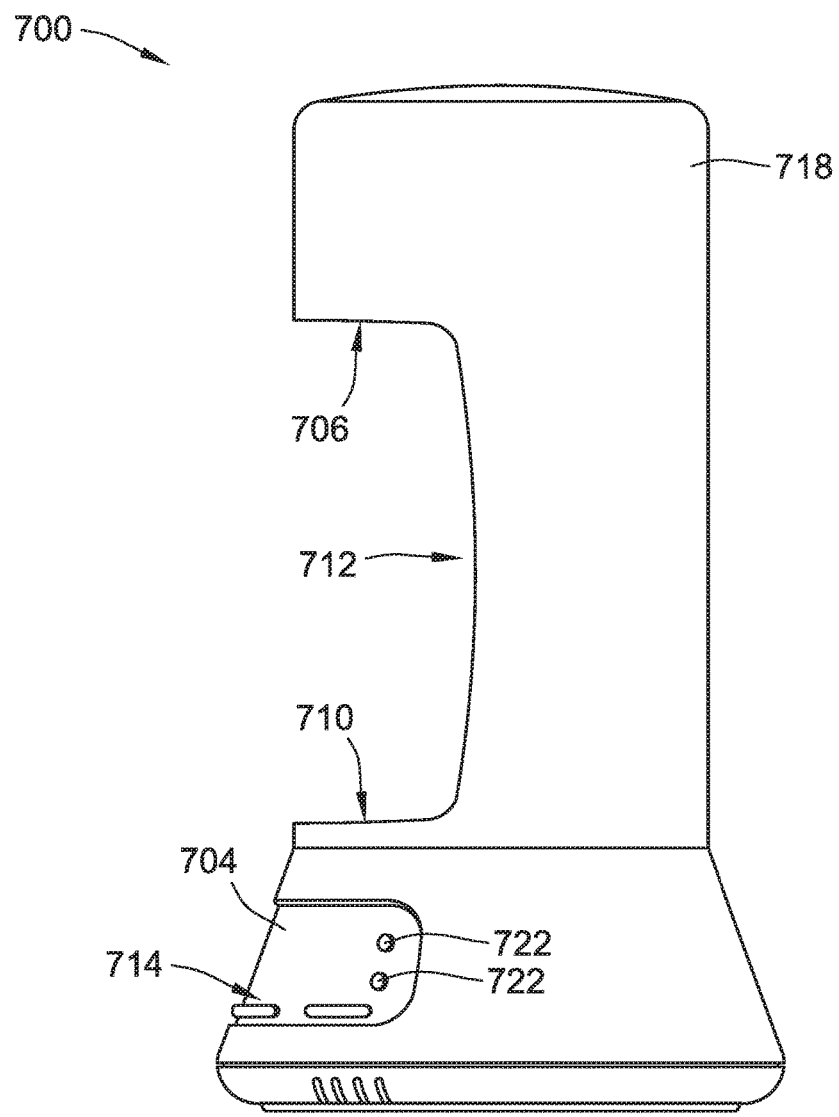
FIG. 8B is a side view of the compounding system's durable base unit shown in FIG. 8A.

Referring now to FIGS. 8A-B, shown is the compounding system 700 with controls according to still another alternate embodiment of the present invention. Preferably, the system comprises a housing body 718 having a vessel receiving portion 712 with a slip resistant bottom surface 710. Alternatively, bottom surface 710 may be a type of key-in surface to lock or otherwise secure the pod or container in place during operation. Alternatively the unit may have a carve out of the base such that the vessel sits on the same surface as the unit or on a base not attached to the unit. The preferred compounding modules for use with the invention will be discussed in greater detail below. Optionally, the compounding system 700 may have a power control switches 722 and process controls 714 to identify for or alert the user to a particular speed or frequency of the mixing based upon the type of nutraceutical or other health product being used or the size or amount being used. Alternatively, an LED or other touch based electronic screen 704 may be employed to provide all the control menus and options for the user of the system. Compounding system 700 further comprises a mixing head (not shown) within the upper portion of housing 718 connected to directly above container receiving portion 712 and which is connected to or integral with stirrer or mixing arm 706 (also not shown).

During operation, after a compounding module is positioned securely on the compounding system by the geometric interface the mixing head lowers agitator stirrer 706 into the contents of the vessel. The compounding system, using either information obtained from the identifier on the compounding module or input supplied by the user to select the appropriate control 714 (or using other control pad 704) for the desired frequency or speed of the mixing. Mixing system 700 may optionally employ a locking mechanism or child safety lock to prevent a child from accidentally selecting an adult size or speed. Optionally, the mixing head may also move up and down as well as partially rotate within housing 718 (e.g., approximately 45%, 60%, 75%, etc.) again to move mixing arm 706 around within the container or pod.

As discussed above with the other embodiments, internal (not shown) to the mixing system 700 is preferably an internal process controller unit (including suitable memory and processing units) optionally linked with an external communication control system. In addition, a barcode reader, beam interuptor, microswitches, RFID scanner or other types of scanning means 708 may be included to read and transmit information from the product being used to the internal process controller unit. As will be understood by those of skill in the system operational arts, during any use, system 700 may be able to track individual uses, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 700 may be able to re-order, and operate commercial transactions on behalf of a user based upon designated user preferences.

Turning our attention now to FIGS. 9 through 19, shown are various embodiments for compounding modules and some of their components that may be employed with the various compounding systems discussed above with respect to FIGS. 3 through 8. Referring first to FIGS. 9A-9B, shown is an embodiment of a compounding module 800 for use with the compounding systems previously described, illustrating a compounding module 800 (802 top pod, 804 bottom vessel), a nutritional supplement part 810, with a mixing paddle 806 having radially projecting blades or fans and an upwardly projecting stem 808 for interfacing with the disclosed compounding systems. The nutritional supplement or vitamin supplement contained within nutritional supplement part 810 for any of the embodiments disclosed herein make be in the form of powder, liquid, dissolvable capsules or tablets, microcapsules, or other known form. The paddle blades can also function to separate the pod into separate distinct compartments that prevent cross contamination between said compartments.

Figure 9A:
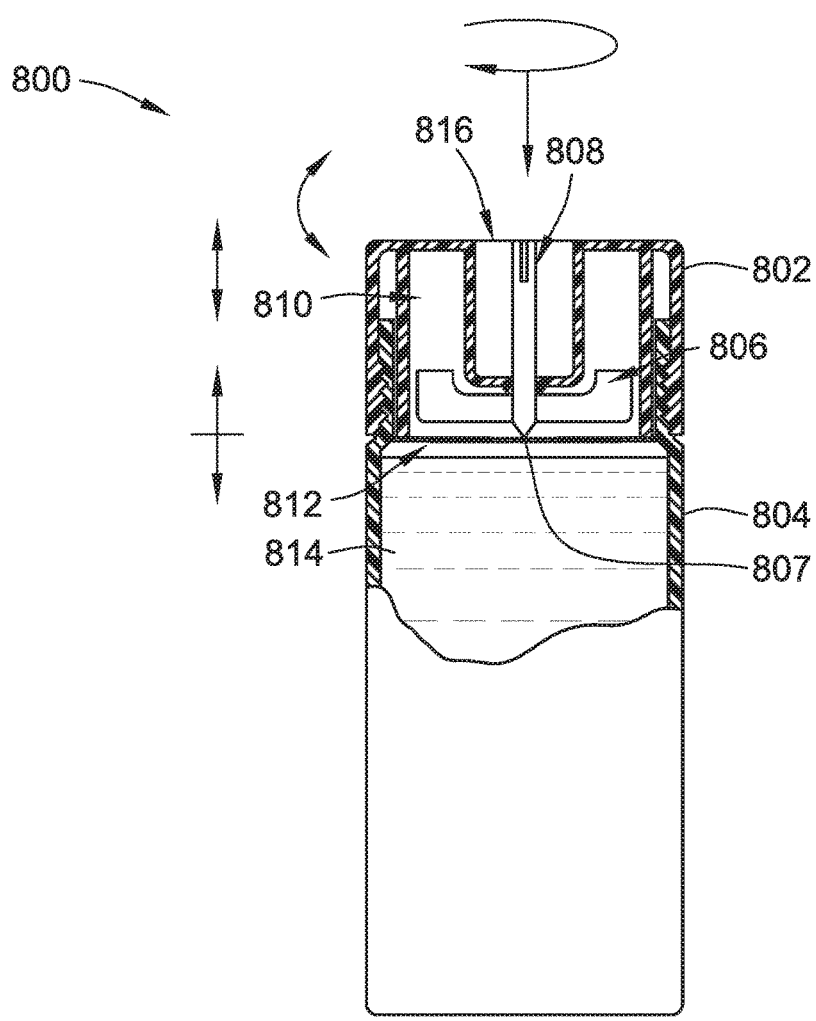
FIG. 9A is a partial cross section front plan view of an alternative two-part pod embodiment for a compounding module with a mixing paddle therein for use with a compounding system according to an alternative embodiment of the invention including an optional container.
Figure 9B:
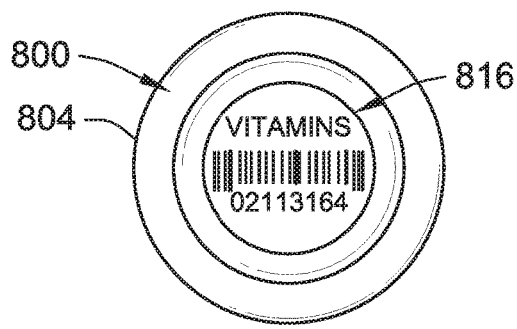
FIG. 9B is a top plan view of the compounding module, assembled for use with the two part pod shown in FIG. 9A.

Preferably, in upper part of 810 of pod 800 has a sealing cap 802 having a sealing membrane 812 and a protective label 816 there on. Optionally, protective label 816 contains a 2D or 3D barcode thereon as seen in FIG. 9A for the compounding system to read, store and/or transmit information about the product being used. Also optionally, lid or cap 802 is secured onto an upper portion of the housing part 804 in a tamper resistant manner such that if the seal is broken the average user would notice. It is noted that lid or clap 802 may be provided separately, without connection to a housing part 804 with a beverage 814. Any of the known tamper resistant mechanisms for bottles or containers may be employed.

During operation, once compounding module 800 is positioned securely into the compounding system, a mixing head will lower the agitator stirrer down onto the upper portion or protective label 816 of pod or container 800. The mixing system will continue to move mixing arm downward until the lower end of the mixing arm connects or otherwise engages with the upper end of stem 808 of paddle 806 such that when mixing arm spins, paddle 806 will rotate at the same speed and/or frequency. Mixing arm continues to apply downward pressure on stem 808 until a lower tip 807 of paddle 806 punctures sealing membrane 812 which had been maintaining nutritional supplement or vitamin 810 away from water 814. Once sealing membrane 812 is punctured nutritional supplement 810 spills into potable liquid in the vessel 814 and mixing arm continue to apply downward pressure on stem 808 until paddle 806 is sufficiently submerged to a distance within potable liquid 814 to adequately and completely mix the potable liquid and nutritional supplement as described above with respect to any of the compounding systems disclosed herein. Once sufficiently mixed, the mixing arm rises out from within vessel 800 so that compounding module 800 may be removed from the compounding system. Optionally, mixing arm (see any of FIGS. 3 through 8) and/or stem 808 may comprise a mechanism or may be configured in such a way that they become securely engaged and that when the mixing arm is removed from container 800, it removes paddle 806 as well. Optionally, paddle may remain with container and be disposed of along with container once all the liquid mixture is gone.

Figure 10:
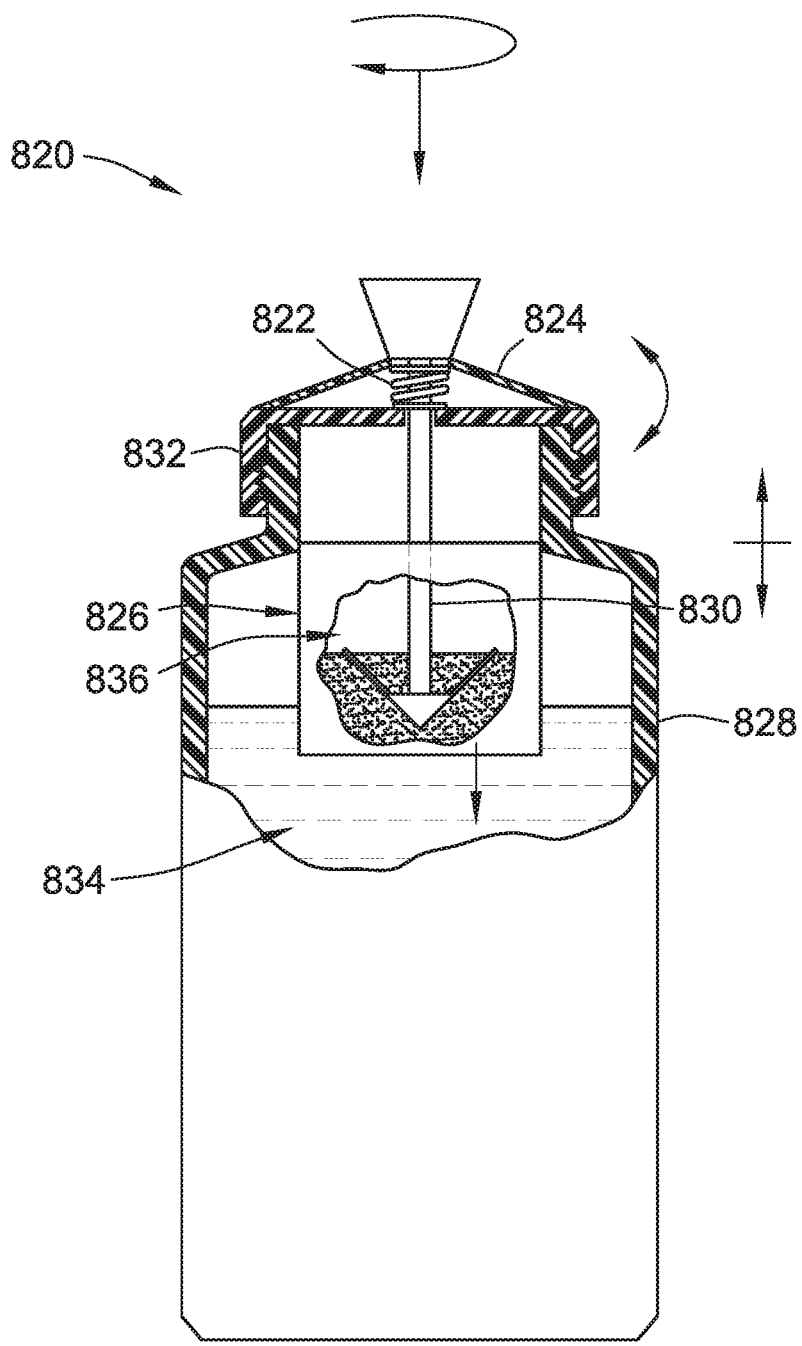
FIG. 10 is an exposed partial cross-sectional view of an alternative embodiment for a compounding module for use with a compounding system according to the invention.
Figure 11:
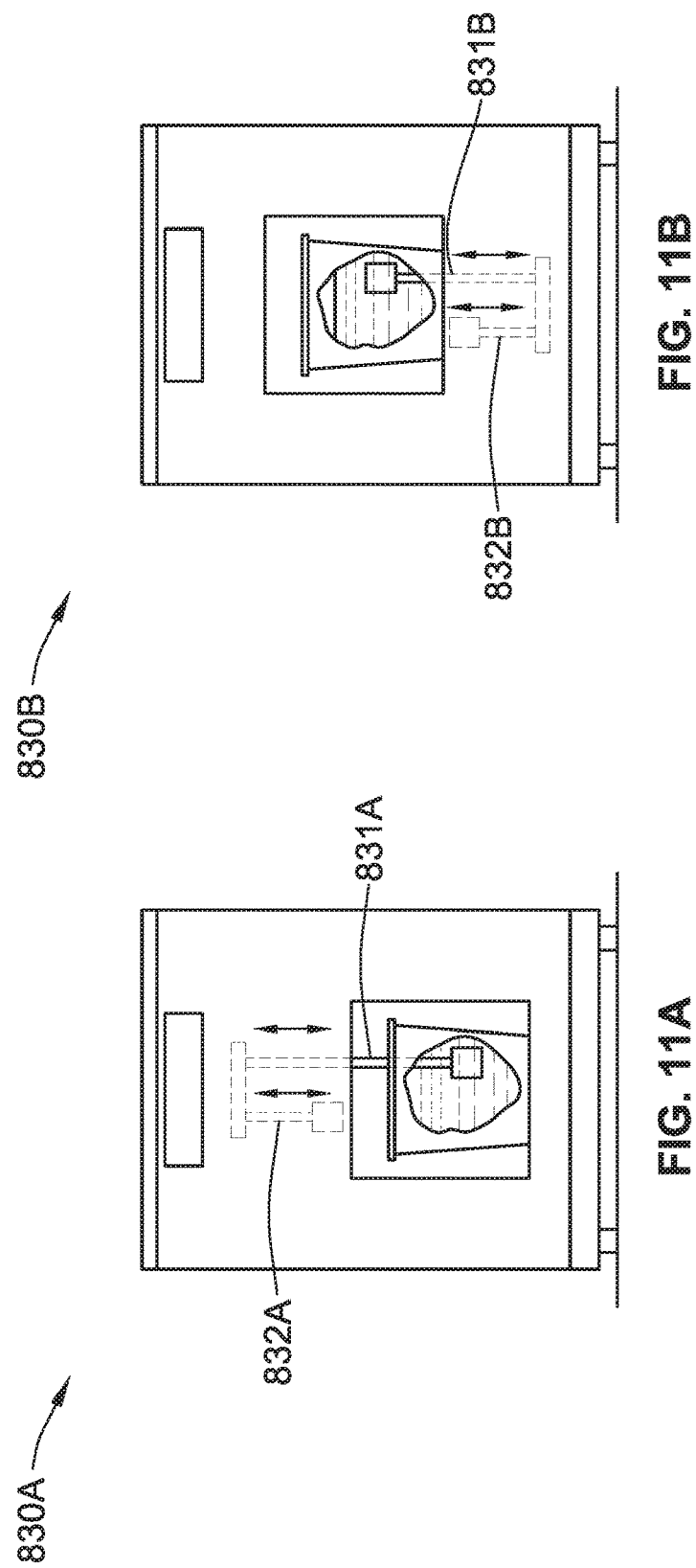
FIG. 11A is a descriptive partially cut-away illustration of a first phase of a compounding system and unit with dual modules a compounding and a filtration or alternative module and process used with the system according to one aspect of the invention with access from a top side.
FIG. 11B is a descriptive partially cut-away illustration of an alternative first phase of a compounding system and unit with dual modules a compounding and a filtration or alternative module and process used with the system according to another aspect of the invention with access from a different side.

Turning next to FIG. 10, shown is an exposed partial cross-sectional view of an alternative embodiment for a compounding module 820 for use with the compounding systems in accordance with the invention. In this embodiment, the compounding module 820 comprises an outer container and inner supplement chamber 826 housing the nutritional supplement blend or vitamins 836. Inner supplement chamber 826 is preferably heat-sealed on its upper end to the upper end of outer container 828. Outer container 828 may preferably be a blow molded polyeurythane (PE) bottle or any other suitable container material for foods. An injection molded PE cap 832 is preferably affixed on the outer side of upper end of outer container 828 and includes an injection molded lance 830 through its top surface such that lance 830 has a lower bladed end within inner supplement chamber 826 and an upper end extending outwardly through the cap 832. Adjacent the outer top side of the cap 832 is preferably positioned a compression spring 822 which is surrounded by a film 824 heat sealed to cap and covering spring 822. Compression spring 822 is configured such that it maintains lance 830 in position until a downward force is applied during use.

As previously discussed, during operation, once compounding module 820 is positioned securely into the compounding system, a mixing head will lower the agitator stirrer down onto the upper portion directly above spring 22 compounding module 820. The compounding system will continue to move its mixing arm downward until the lower end of the mixing arm connects or otherwise engages with the upper end of lance 830. Mixing arm continues to apply downward pressure on upper end of lance 830 until a lower tip of lance 830 punctures the lower end of supplement chamber 826. Once broken, nutraceuticals 836 spills into the potable liquid 834 and mixing arm continue to apply downward pressure on lance 830 until sufficiently submerged to a distance within the potable liquid 834 to adequately and completely mix the potable liquid and nutraceutical supplement as described above with respect to any of the compounding systems disclosed herein. Once sufficiently mixed, the mixing arm rises out from within container 820 so that container 820 may be removed from the compounding system. Optionally, mixing arm (see any of FIGS. 3 through 8) and/or lance 830 may comprise a mechanism or may be configured in such a way that they become securely engaged and that when the mixing arm is removed from container 820, it removes lance 830 as well.

Referring next to FIGS. 11A-B, shown are two alternative descriptive illustration of a two phase system 830A, 830B. In system 830A, a phase one 831A and phase two 832A of a bi-pod filtration process used with the system according to one aspect of the invention. In use, a first phase filters and a second phase mixes. In system 830B, a phase one 831B and phase two 832B of a bi-pod filtration process are provided, but in system 830B, it is noted that the mixing approach is from a bottom orientation of a liquid container. Therefore, it is recognized that adaptive mixing orientations may be provided within the scope and spirit of the present invention.

Figure 12:
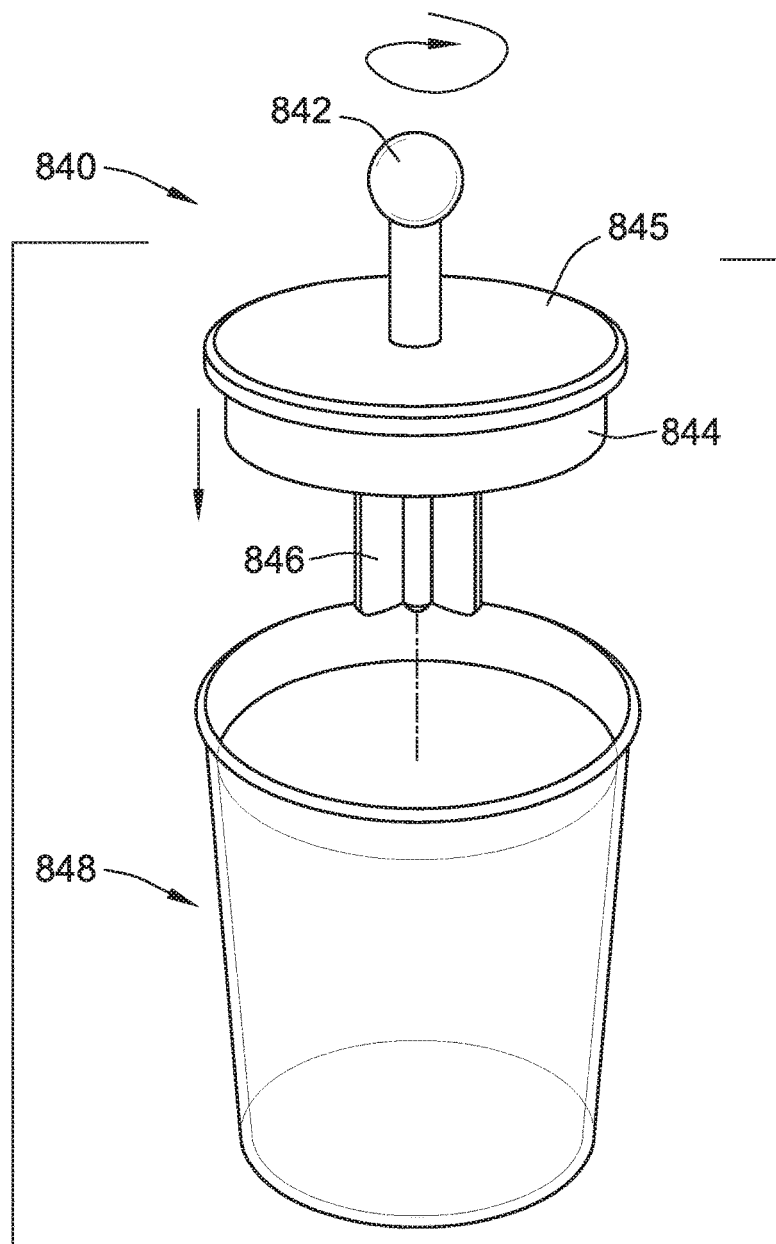
FIG. 12 is an exploded perspective view of an alternative embodiment for a compounding module and vessel for use with the compounding system in accordance with the invention.

Looking now at FIG. 12, shown is an exploded perspective view of another alternative embodiment for a compounding module 840 for use with a compounding system in accordance with the invention. As shown, the compounding module 840 comprises housing or container 848 for holding liquid, and stir pod 845 comprising upper shaft 842 (preferably of a hex shape or some other shape such that secure interface may be made with the lower end of a mixing arm), side portions 844 and mixing paddle 846. During operation, once compounding module 840 is positioned securely into the compounding system, a mixing head will lower the mixing arm or agitator stirrer down onto the upper portion directly above and engages upper shaft 842 without applying too much pressure. The compounding system will then begin rotation (see arrow) of the mixing arm thereby rotating stir pod 845.

Depicted in FIGS. 13A through 16 are alternative embodiments for the compounding module. For example, FIGS. 13A-B shows compounding module 850 in its closed (FIG. 13A) and its open (FIG. 13B) positions. During use, the centrifugal force from rotation of compounding module 850 from engaging the mixing arm of one of the above described compounding system and generates sufficient centrifugal force to open a plurality of pivoting blades 852 thereby spilling the nutraceutical therefrom and into the potable liquid in the vessel below. Blades 852 (via continuous rotation after opening) are then used to mix the potable liquid and nutritional supplement. Similarly, FIGS. 14A-C shows compounding module 854, 860 (compounding module 860 only having two blades not three in FIG. 14B) in closed (FIG. 14A) and open (FIG. 14B-C) positions. During use, pressure applied to extending tabs 856 during rotation of stir pods 854, 860 and mixing resistance opens blades 858, 862 thereby spilling the nutritional supplement blend therefrom and into the liquid in the potable vessel below. Blades 858, 862 are then used to mix the potable liquid and nutraceutical. Looking at FIGS. 15A-B shown is another alternate embodiment for a compounding module for use with the invention. That is, compounding module 864 comprises veins or inwardly opening blades 866 such that with rotation thereof water flows into the compounding module 864 and out through an opening 868 on a bottom end of the compounding module 864. During use, the centrifugal force from rotation of stir pod 884 from engaging the mixing arm of one of the above described compounding units generates sufficient force to open blades 866 inwardly or allow liquid to break through a seal of some kind to mix with the nutritional supplement within stir pod 864 and flow out through its bottom thereby spilling the combined water-nutritional supplement blend from the stir pod 864. Briefly, FIG. 16 shows a perspective view of one embodiment of a multi-unit storage tray 900 how any of the spinning pods may be packaged for proper sealing and safe handling.

As an alternative embodiment to the portable electronic mixing systems disclosed above, shown in FIGS. 17A-C, 18A-C and 19 describe various embodiments for a portable and disposable two part pod mixing system in accordance with the invention.

Referring first to FIGS. 17A-D, shown is a first embodiment of a pod or container 900. As illustrated, mixing container 900 preferably comprises a blow molded (P.P. or PET) housing 904, which is heat sealed on its lower end 906 with a PP or foil membrane to a blow molded PP lower compressible container 910. Preferably, housing 904 contains liquid (i.e., approximately 3 ounces of water) while lower collapsible container 910 contains the desired nutritional supplement. On its upper end, housing 904 is removably closed with a cap, such as the cap for an ordinary water bottle or soda bottle. Also optionally, lid or cap 902 is secured onto an upper portion of housing part 904 in a tamper resistant manner such that if the seal is broken the average user would notice. Any of the known tamper resistant mechanisms for bottles or containers may be employed. Of course, a larger lid configuration of container having a large lid such as container 901 may be used.

Also, within lower collapsible container 910 is positioned, preferably affixed to the bottom surface thereof, a foil or membrane piercing divider 914. Upon shaking or vigorous up and down motion of the container 900, piercing divider 914 punctures (912) foil or membrane 908 thereby allowing the nutritional supplement in lower container 910 to mix with the water in housing 904 upon continued shaking. Accordingly, while it is preferred that piercing divider 914 be configured as shown, i.e., in the shape of a pyramid, any shape divider which has a sharp enough apex would suffice.

Figure 18B:
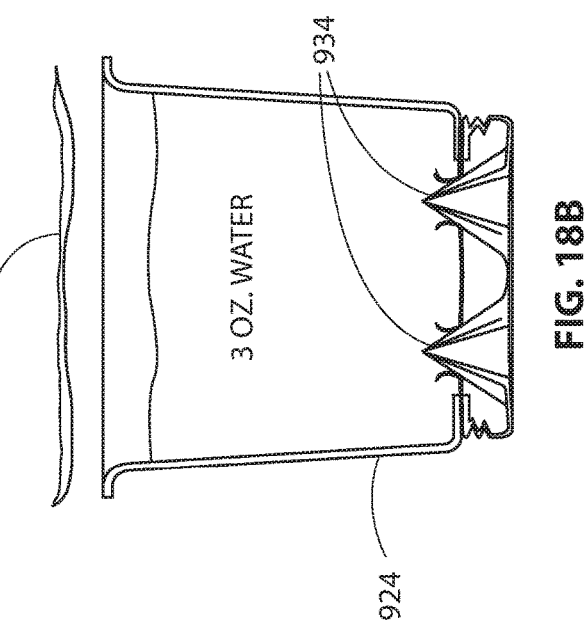
FIG. 18B is an exposed cross-sectional view of the two part pod shown in FIG. 18A further showing multiple membrane piercing component upon compression of the two part pod.
Figure 18C:
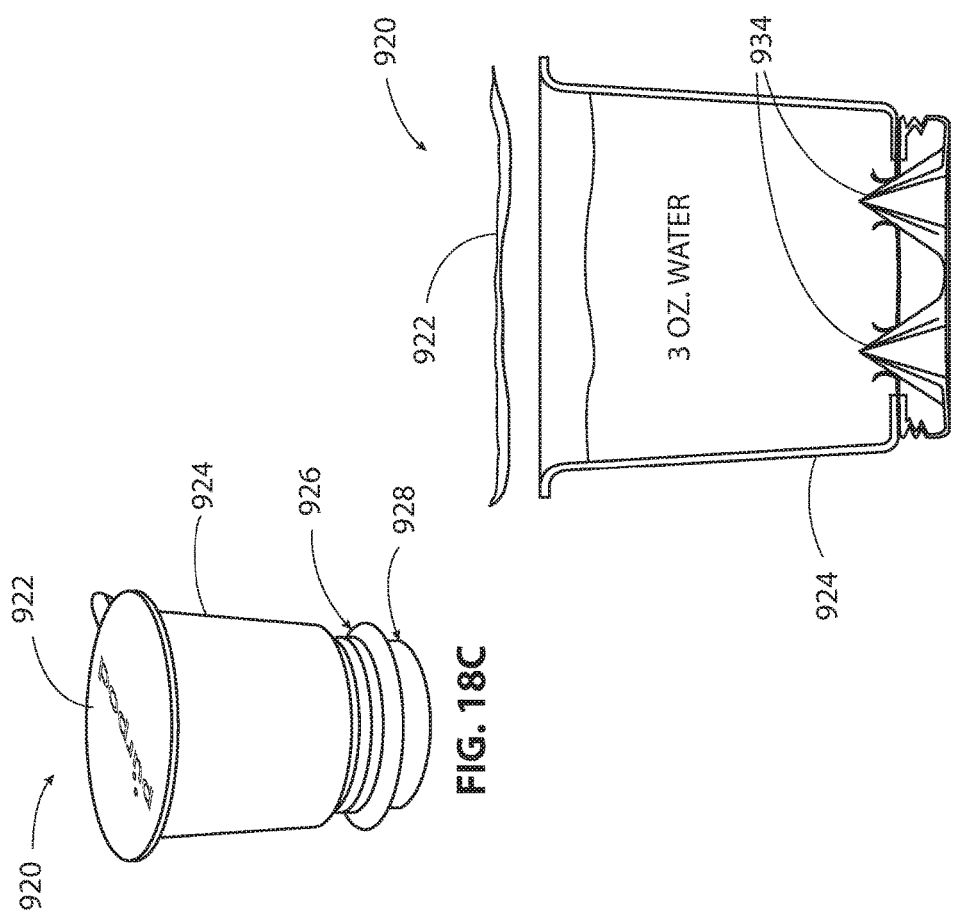
FIG. 18C is a perspective view of an alternate embodiment of the two part pod shown in FIGS. 18A-B.
Figure 18A:
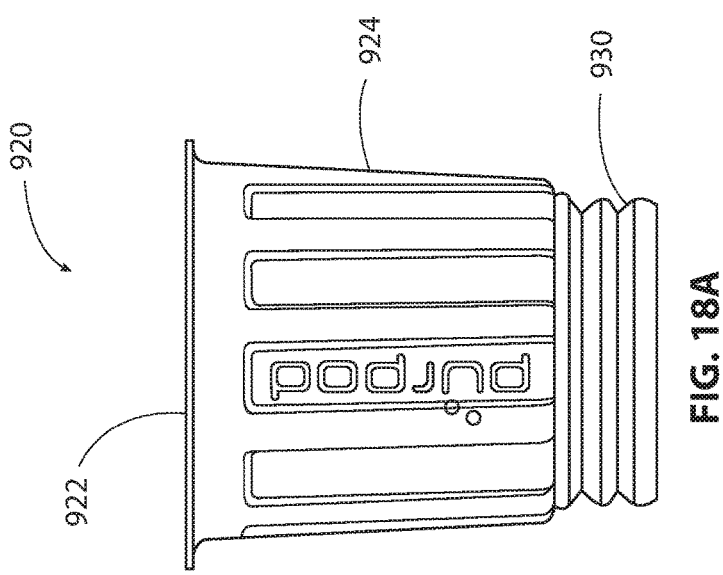
FIG. 18A is a front plan view of yet another alternative embodiment for a two part pod for use with the mixing system in accordance with the invention.

Turning to FIGS. 18A-B, shown is a second embodiment of a two compartment mixing pod or container 9200. As illustrated, mixing container 920 here preferably comprises a blow molded (P.P. or PET) housing 904, which is heat sealed on its lower end with a PP or foil membrane to a blow molded PP lower compressible container 930. Preferably, housing 924 contains liquid (i.e., approximately 3 ounces of water) while lower collapsible container 930 contains the desired nutritional supplement. On its upper end, housing 924 is removably closed with a tamper resistant heat sealed pull off lid 922, such as the pull off lid for a container of yogurt.

Also, within lower collapsible container 930 is positioned, preferably affixed to the bottom surface thereof, a foil or membrane piercing divider 934. Upon shaking or vigorous up and down motion of the container 920, piercing divider 934 punctures the foil or membrane thereby allowing the nutritional supplement in lower container 930 to mix with the water in housing 924 upon continued shaking. Accordingly, while it is preferred that piercing divider 914 be configured as shown, i.e., in the shape of a pyramid, any shape divider which has a sharp enough apex would suffice. Moreover, while two piercing dividers are shown, other numbers of dividers may be used with the invention.

As seen in FIG. 18C, yet another alternate embodiment of the two part mixing pod is shown. Here, pod 920 comprises on its lower end an expandable lower region 926 which on its lower end is heat sealed to lower collapsible compartment 928. In this embodiment, upon shaking or vigorous up and down motion of the container 920, a piercing divider, much like divider 934 seen in FIG. 18B punctures the foil or membrane thereby allowing the nutritional supplement in lower container 928 to mix with the water in housing 924 upon continued shaking. Preferably, upon puncture of the membrane, lower compartment 928 compresses or collapses while at the same time or close to the same time expanding region 926 of pod 920 expands to allow for extra space with housing 924 upon entry of the nutritional supplement.

Figure 19:
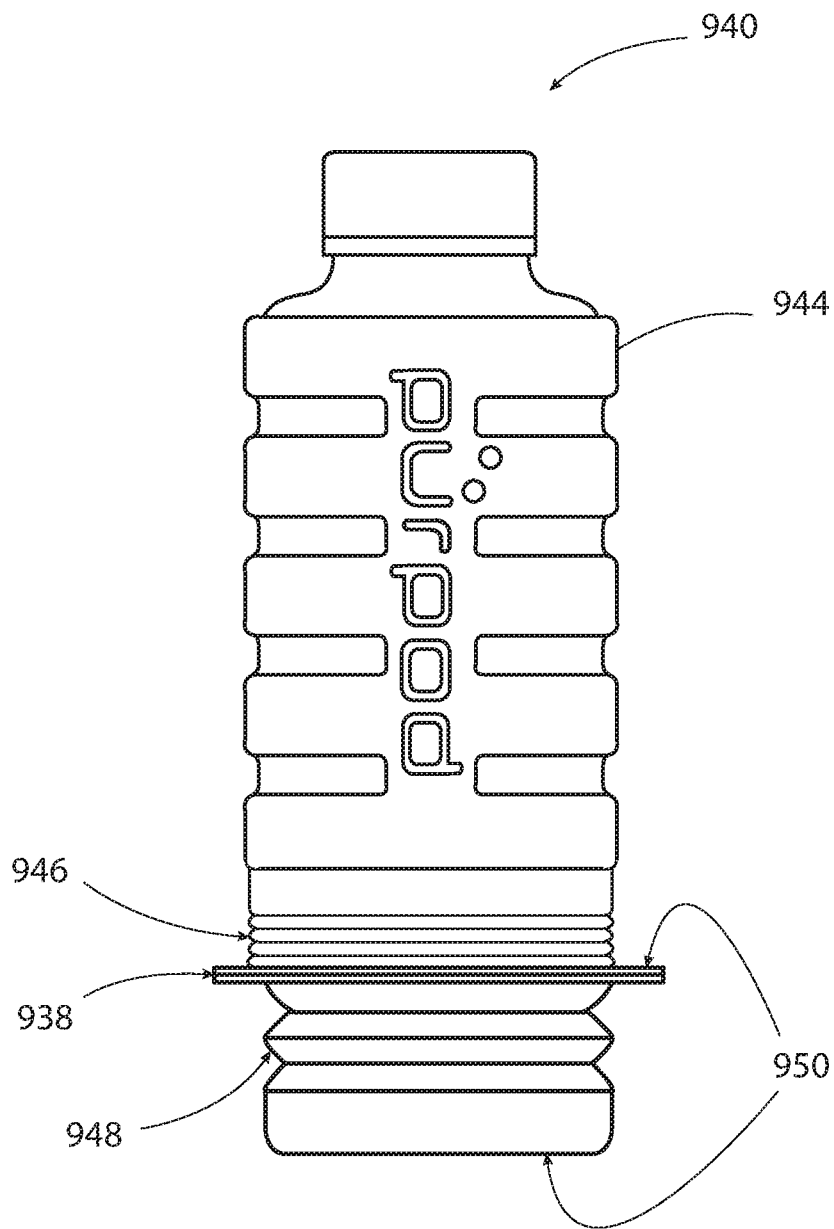
FIG. 19 is a front plan view of still another alternative embodiment for a two part pod or compartment for use with the mixing system in accordance with the invention.

Similar to the embodiment just described with respect to FIG. 18C, yet another alternate embodiment of the two part mixing pod is shown in FIG. 19, which is similar to the two compartment pods shown in FIGS. 17A-B but with the added expandable region 946. Here, pod 940 comprises on its lower end an expandable lower region 946 which on its lower end is heat sealed 938 to lower collapsible compartment 948. In this embodiment, upon shaking or vigorous up and down motion of the container 940, a piercing divider, much like divider 934 seen in FIG. 18B, punctures the foil or membrane thereby allowing the nutritional supplement in lower container 948 to mix with the water in housing 944 upon continued shaking. Preferably, upon puncture of the membrane, lower compartment 948 compresses or collapses while at the same time or close to the same time expanding region 946 of pod 940 expands to allow for extra space within housing 944 for entry of the nutritional supplement. Alternatively, pod 940 may be held by a machine at 950. The machine would compress lower compartment 948, then shaking pod 940 such that expanding region 946 expands.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. The scope of the invention, therefore, shall be defined solely by the following claims. It should be appreciated that the present invention is capable of being embodied in other forms without departing from its essential characteristics.

What is claimed is:

1. A method of making a beverage using a machine, the method comprising:
   receiving, in the machine, a module having a code thereon, the module having a plurality of compartments therein storing a composition, each of the plurality of compartments being separated from the other of the plurality of compartments to prevent cross contamination between the plurality of compartments, the composition being sealed within the plurality of compartments via a sealing membrane;
   responsive to the receiving the module, reading, via a scanner of the machine, the code on the module to obtain information associated with how to mix the composition;
   receiving a vessel in the machine such that the vessel is engaged therewith; and
   responsive to receiving an input, via the machine, to initiate operation of the machine, operating the machine to make the beverage based at least in part on the obtained information, the operating including:
   puncturing the sealing membrane such that the composition falls from the module into the vessel;
   introducing a potable liquid into the vessel from a reservoir of the machine; and
   mixing, via a mixing paddle, the composition and the potable liquid in the vessel to make the beverage from a bottom orientation of the vessel, the mixing including rotating the mixing paddle.

2. The method of claim 1, further comprising, subsequent to the receiving of the module, detecting the presence of the module in the machine and causing the reading to occur.

3. The method of claim 1, wherein the machine includes a key-in surface that engages the vessel during the operation of the machine.

4. The method of claim 1, wherein the operating the machine to make the beverage based at least in part on the obtained information further includes selecting, based on the obtained information, a desired frequency or speed for the mixing.

5. A method of making a beverage using a machine, the method comprising:
   receiving, in the machine, a module having a code thereon, the module having a plurality of compartments, each of the plurality of compartments storing a composition therein, each of the plurality of compartments being separated from the other of the plurality of compartments to prevent cross contamination between the plurality of compartments, the composition being sealed within the plurality of compartments via a sealing membrane;
   reading, via a scanner of the machine, the code on the module to obtain information associated with the composition;
   receiving a vessel in the machine such that the vessel is engaged therewith; and
   responsive to receiving an input, via the machine, to initiate operation of the machine, operating the machine to make the beverage based at least in part on the obtained information, the operating including:

puncturing the sealing membrane such that the composition falls from a first one of the plurality of compartments into the vessel;

introducing a potable liquid into the vessel; and mixing the composition and the potable liquid in the vessel to make the beverage.

6. The method of claim 5, wherein the mixing includes mixing via a mixing paddle.

7. The method of claim 6, wherein the mixing via the mixing paddle includes rotating the mixing paddle.

8. The method of claim 7, wherein the mixing includes mixing the composition and the potable liquid from a bottom orientation of the vessel.

9. The method of claim 7, wherein the mixing paddle is submerged a distance in the potable liquid during the mixing operation of the machine.

10. The method of claim 5, wherein the mixing includes mixing the composition and the potable liquid from a bottom orientation of the vessel.

11. The method of claim 5, wherein the machine includes a slip resistant element that engages the vessel when the vessel is received in the machine.

12. The method of claim 5, wherein the machine includes a key-in surface that secures the vessel during the operation of the machine.

13. The method of claim 5, wherein the operating the machine to make the beverage based at least in part on the obtained information further includes selecting, based on the obtained information, a desired frequency or speed for the mixing.

14. The method of claim 5, further comprising, subsequent to the receiving of the module, detecting the presence of the module in the machine and causing the reading to occur.

15. The method of claim 5, wherein the composition is a dry powder.

16. The method of claim 5, wherein the composition is a vitamin supplement and the potable liquid is water.

17. The method of claim 5, wherein the module is received via a geometric interface of the machine.

18. The method of claim 5, wherein the information associated with the composition includes (i) identification information that identifies the composition and (ii) use information indicating how the composition is to be mixed.

19. The method of claim 5, wherein the code is a barcode and the scanner is a barcode scanner.

20. The method of claim 5, further comprising transmitting the obtained information from the scanner to a controller unit of the machine.

21. The method of claim 5, wherein the potable liquid is introduced into the vessel from a reservoir of the machine.

22. The method of claim 21, wherein the reservoir is detachable from the machine.

23. The method of claim 5, further comprising controlling a rate of introduction of the potable liquid into the vessel.

24. The method of claim 5, further comprising, prior to the operating of the machine, detecting if the vessel is engaged with the machine.

25. The method of claim 24, responsive to a determination that the vessel is not engaged with the machine, prompting a user of the machine to supply the vessel.

26. The method of claim 5, wherein the module is disposable.

27. The method of claim 5, wherein the module is made of recyclable material.

* * * * *